US008117597B2

(12) United States Patent
Shia

(10) Patent No.: US 8,117,597 B2
(45) Date of Patent: Feb. 14, 2012

(54) METHOD AND SYSTEM FOR SPECIFYING AND DEVELOPING APPLICATION SYSTEMS WITH DYNAMIC BEHAVIOR

(76) Inventor: So-ming Daniel Shia, San Francisco, CA (US)

(*) Notice: Subject to any disclaimer, the term of this patent is extended or adjusted under 35 U.S.C. 154(b) by 1390 days.

(21) Appl. No.: 11/432,849

(22) Filed: May 13, 2006

(65) Prior Publication Data

US 2006/0259289 A1   Nov. 16, 2006

Related U.S. Application Data

(60) Provisional application No. 60/681,420, filed on May 16, 2005.

(51) Int. Cl.
*G06F 9/44* (2006.01)
(52) U.S. Cl. ......... 717/123; 717/126; 717/128; 717/131
(58) Field of Classification Search .................. 717/111, 717/124–125, 127–129; 719/318, 321; 714/39; 709/206, 224, 246
See application file for complete search history.

(56) References Cited

U.S. PATENT DOCUMENTS

| | | | | | |
|---|---|---|---|---|---|
| 5,257,363 | A * | 10/1993 | Shapiro et al. | ................. | 703/13 |
| 5,297,057 | A * | 3/1994 | Kramer et al. | .................. | 703/7 |
| 5,754,845 | A * | 5/1998 | White | ........................... | 717/147 |
| 5,831,853 | A * | 11/1998 | Bobrow et al. | ................. | 700/86 |
| 6,115,710 | A * | 9/2000 | White | ................................. | 1/1 |
| 6,550,057 | B1 * | 4/2003 | Bowman-Amuah | ......... | 717/126 |
| 6,662,225 | B1 * | 12/2003 | Motoyama et al. | .......... | 709/224 |
| 6,807,583 | B2 * | 10/2004 | Hrischuk et al. | .............. | 719/318 |
| 6,951,022 | B1 * | 9/2005 | Golde et al. | .................. | 719/318 |
| 6,983,227 | B1 * | 1/2006 | Thalhammer-Reyero | ........ | 703/2 |
| 7,367,025 | B1 * | 4/2008 | Nikolov et al. | ................ | 717/158 |
| 7,451,447 | B1 * | 11/2008 | Deshpande | .................... | 718/102 |
| 7,506,315 | B1 * | 3/2009 | Kabadiyski et al. | .......... | 717/128 |
| 7,512,531 | B1 * | 3/2009 | Shia | ................................ | 703/16 |
| 7,519,960 | B2 * | 4/2009 | Mei et al. | ....................... | 717/129 |
| 7,559,060 | B2 * | 7/2009 | Schmidt et al. | ................ | 718/100 |
| 7,574,654 | B2 * | 8/2009 | Motoyama et al. | ............ | 715/704 |
| 7,680,888 | B1 * | 3/2010 | Marmaros et al. | ............. | 709/206 |
| 7,797,669 | B1 * | 9/2010 | Rehof et al. | ..................... | 717/100 |
| 2002/0065950 | A1 * | 5/2002 | Katz et al. | ...................... | 709/318 |
| 2002/0120921 | A1 * | 8/2002 | Coburn et al. | ................. | 717/140 |
| 2002/0194393 | A1 * | 12/2002 | Hrischuk et al. | .............. | 709/318 |
| 2003/0050983 | A1 * | 3/2003 | Johnson | ......................... | 709/206 |
| 2003/0182083 | A1 * | 9/2003 | Schwenke et al. | ............. | 702/183 |
| 2004/0006652 | A1 * | 1/2004 | Prall et al. | ...................... | 709/318 |

(Continued)

OTHER PUBLICATIONS

Title: Specification and design of transactions in information systems: a formal approach, author: Babin G et al, source: IEEE, dated: Aug. 1991.*

(Continued)

*Primary Examiner* — Chameli Das
(74) *Attorney, Agent, or Firm* — Brian N. Young; Fountainhead Law Group P.C.

(57) ABSTRACT

System for specifying dynamic application system behavior, procedures and methods about its operations, and methods about how to develop such a behavior model are provided in the present invention. A Dynamic System (DS) and its operations are provided to model complex and dynamic system behavior in general. To specify behavior of an application system in a distributed environment, an external DS is used to model the external behavior, a Proactive System is used to model the reactive behavior and an internal DS is used to model the internal active behavior of such an application system. A graphical notation of DS and its components are also provided.

10 Claims, 22 Drawing Sheets

U.S. PATENT DOCUMENTS

| | | | | |
|---|---|---|---|---|
| 2004/0073404 A1* | 4/2004 | Brooks et al. | | 702/183 |
| 2004/0128120 A1* | 7/2004 | Coburn et al. | | 703/26 |
| 2004/0226018 A1* | 11/2004 | Motoyama et al. | | 719/310 |
| 2005/0235264 A1* | 10/2005 | Hines | | 717/124 |
| 2005/0278670 A1* | 12/2005 | Brooks et al. | | 716/5 |
| 2006/0167771 A1* | 7/2006 | Meldahl | | 705/30 |
| 2006/0184410 A1* | 8/2006 | Ramamurthy et al. | | 705/8 |

OTHER PUBLICATIONS

Title: Revisiting a Formal Framework for Modeling Aspects in the Design Phase, author: de Paula et al, source: IEEE, dated: May 20, 2007.*

* cited by examiner

Drawings

METHOD AND SYSTEM FOR SPECIFYING AND DEVELOPING APPLICATION SYSTEMS WITH DYNAMIC BEHAVIOR

PRIORITY CLAIM/RELATED CASE

This application claims priority under 35 U.S.C. 119(e) to U.S. Provisional Patent Application Ser. No. 60/681,420, filed on May 16, 2005 and entitled "Method and apparatus for modeling dynamic system behavior" which is incorporated herein by reference in its entirety for all purposes.

FIELD OF THE INVENTION

The present invention relates to flow charts, activity diagrams, business process, process modeling, work flow, state machines, protocol specifications, application software design and implementation.

BACKGROUND OF THE INVENTION

Traditionally, the system behavior are modeled in two different approaches. One focuses on internal active activities that a system performs, whereas the other focuses on behavior reacting to external events. This two-prong approach is reflected by the fact that Activity diagram, which focuses on active behavior, and Statechart, which focuses on reactive behavior, are two different styles of diagrams in United Modeling Language (UML). Let's call the former approaches "active behavior modeling" and the latter ones "reactive behavior modeling".

Active behavior modeling includes flow chart, Business Process Modeling Notation (BPMN), XML Process Definition Language (XPDL), Business Process Execution Language (BPEL) and UML Activity diagrams. Both BPMN and UML Activity diagram use nodes in a diagram to represent activities to perform, while using links to connect one node to another representing the sequence of these activities. On the other hand, XPDL and BPEL define these activity nodes and their links in an eXtensible Markup Language (XML) syntax instead of a diagram.

While these active behavior modeling notations are useful in describing internal active behavior of a system, they are inadequate for defining reactive behavior in response to external events that may occur at any time. A typical approach is to have some special event detecting activities, such as "receive" in BPMN and BPEL, to detect these possible external events. Since external events can happen any time, various event detecting activities have to be inserted in various places in a diagram. However, unlike a state machine, these active behavior modeling diagrams don't have a "state" where all event detecting activities can be grouped together. The result is that these event detecting activities are scattered all over the places in a diagram and makes it very difficult to know what external events an application system is waiting for at any point in time during execution.

A major drawback of this approach is that if a correct detection activity is not inserted in a critical position in a diagram, some unexpected events will be left unprocessed and the application system may crash at run time. To overcome this problem, a designer may try to place various event detection activities all over the diagram. The result may be an overly complex diagram.

Another drawback is that since these event detection activities are inserted in a diagram in an ad hoc and unstructured way, it is very difficult to verify if the system behavior as defined in the diagram is consistent with other systems that it communicates with. This deficiency has caused many critical design problems with an application system that needs to interact with other systems.

While an active behavior modeling notation fails to provide an adequate facility to support reactive behavior in response to external events, a reactive behavior modeling notation is designed specifically to address this issue.

Reactive behavior modeling includes finite state machines (FSMs), UML Statechart, and Dynamic State Machine. A pure FSM includes a number of states and their outgoing transitions with external events clearly specified for each transition. While at a state, the FSM is waiting for all possible external events. Upon receiving a valid external event, a transition is triggered and an associated action is performed along with the transition. After a transition, the current state becomes inactive, and another state becomes active. The FSM then waits for another set of events associated with the new active state. Therefore, at any time, a FSM typically is in a particular state waiting for various possible external events to happen.

A pure FSM has a number of disadvantages. For example, one undesirable restriction is that a pure FSM has no memory. Due to its lack of memory, the usage of a pure FSM is very limited. Since a state in a pure FSM contains no memory, any change or information about history, such as a simple counter, must be presented by defining additional states in order to maintain these changes. Given the infinite number of values that a counter may have, an infinite number of states would be required.

Extended finite state machines (EFSMs) or Register Automata add memory or data variables to each state to contain values, such as numbers and counters, to overcome the major problem of a pure FSM as described above. EFSMs are widely used to model various reactive systems.

When EFSMs are used to model some real world events or behavior, it is often found that a hierarchical of states or nested states are useful to reduce the number of states and to organize a complex set of states into a hierarchy. Statechart as part of the United Modeling Language (UML) and STATEMATE are some examples. Statechart is the term used herein to refer to a hierarchical finite state machine.

Although a reactive behavior modeling notation is design to deal with external events, it typically overlooks how to specify complex internal active behavior. As we have already learned from using some active behavior modeling notations, these internal active behavior can be extremely complex. It would be highly desirable to incorporate an active behavior modeling notation that is consistent to the reactive behavior modeling notation.

Another common deficiency shared by existing active and reactive behavior modeling notations is that they can only specify the behavior of a single system. Complex internal messages exchanged among components inside of a super system are not modeled in any way. The lack of support for behavior of multiple parties is very limiting in a distributed computing environment where a system may contain multiple sub-systems who communicate with each other to coordinate their work.

What is needed is a comprehensive approach to unify both active behavior modeling and reactive behavior modeling notations in a single consistent modeling notation that also supports dynamic behavior of multiple parties in the modern distributed computing environment. The present invention provides such a solution.

BRIEF SUMMARY OF THE INVENTION

This invention describes method and system for specifying and developing application systems with dynamic behavior.

One purpose of this invention is to improve how we specify dynamic behavior of an application system in diagrams to facilitate the development of such a system in a computer software or hardware.

Another purpose is to provide necessary mechanisms and methods so that design tools, code generators and run time platforms can be developed to realize the dynamic behavior specified.

In order to achieve these purposes, system for specifying dynamic application system behavior, procedures and methods about its operations, and methods about how to develop such a behavior model are provided in the present invention.

This invention uses a Dynamic System (DS) type for specifying dynamic behavior of an application system. A DS type can be either simple or composite. A simple DS type has a Behavior type for specifying simple behavior of the application system. A composite DS type (of model 1) has a number of Phased Machine (PM) types, which specify complex sequential and parallel behavior of the application system, and either an Exit-condition set or an exit function. Each PM type has one or more Phase types and an optional Static-count. Each Phase type has a sub-DS type and zero or more Transitions. Each Transition has a Transition-predicate and a Target-phase.

If an exit function is specified, it returns an exit code that identifies a condition under which an instance of the composite system type exits. If an Exit-condition set is specified, each Exit-condition has a pair of Exit-predicate that specifies a condition under which an instance of the composite system type exits and an exit-code that identifies the associated Exit-condition.

While one PM type may have a plurality of Phase types for specifying a sequential behavior of the composite DS, another PM type may have only one Phase type for specifying a parallel behavior of the composite DS.

The DS type can be specialized into a Proactive System (PS) type to specify the reactive behavior of a system that interacts with others in a distributed environment. A PS type is either simple or composite. A simple PS type is a specialization of the simple DS type. It's behavior has an External DS (Ext-DS) type followed by an Internal DS (Int-DS) type. The Ext-DS type specifies external incoming events to occur when communicating with another system, whereas the Int-DS type specifies internal actions to perform in response to the occurrence of those external events. A composite PS type is a specialization of the composite DS type. Hence, it is the same as a composite DS type except that it contains sub-PS types instead of sub-DS types.

An Ext-DS type is also a specialization of a DS type. An Ext-DS type is either simple or composite. A simple Ext-DS type is a specialization of the simple DS type with an Event type as its Behavior to specify an external incoming event type in a communication protocol. A composite Ext-DS type is a specialization of the composite DS type. Hence, it is the same as a composite DS type except that it contains sub-Ext-DS types instead of sub-DS types.

An Int-DS type is also a specialization of a DS type. An Int-DS type is either simple or composite. A simple Int-DS is a special kind of simple DS that has an Action type as its Behavior to specify an internal action to perform. A composite Int-DS s a specialization of the composite DS type. Hence, it is the same as a composite DS type except that it contains sub-Int-DS types instead of sub-DS types.

At run time, multiple instances of DS types, including PS types, Ext-DS types and Int-DS types, can be created. A DS instance is either simple as composite. A simple DS instance has a type reference to its DS type and a Result that records the outcome of performing its behavior. A composite DS instance has a type reference to its DS type, a Result, and a number of PM's. Each PM has a type reference to its PM type, a Current-phase, and a number of Phases. Each Phase has a type reference to its Phase type and a sub-DS instance.

After a DS instance is created, various parts of the DS instance can be activated and deactivated at run time to model the evolving behavior of a real world system. Similar to a DS instance, various parts of a Ext-DS instance, Int-DS instance and PS instance can be activated and deactivated at run time to model the evolving behavior of the corresponding real world system.

To specify an Int-DS to be performed immediately after a simple PS becomes active, a predefined "Entry" event type can be specified in the Ext-DS of the simple PS type. To specify an Int-DS to be performed immediately before a simple PS becomes inactive, a predefined "Exit" event type can be specified in the Ext-DS of the simple PS.

One main benefit of the present invention is that a single consistent general model based on DS is used throughout the design process while a particular specialization of this general model is used in each design step to focus on a specific behavior aspect.

A graphical representation of these DS types, including PS types, Ext-DS types and Int-DS types, are provided in this invention. A DS type can be graphically represented as a containment box. A containment box representing a composite DS type may contain a number of sub-containment boxes, a number of bi-directional interaction links, a number of Creation arrows, a number of Transition arrows, and a number of Exit-points. Each of these sub-containment boxes represents either a simple or composite sub-DS. A composite sub-DS may be shown with its own sub-sub-containment boxes within its boundary. A sub-containment box with at least one Transition arrow represents a sequential sub-DS, whereas a sub-containment box without any transition arrow represents a parallel sub-DS.

A simple PS is graphically represented as a containment box with two sub-containment boxes. One of these sub-containment boxes represents the Ext-DS that specifies external events to receive and another sub-containment box represents the Int-DS that specifies internal activities to perform in response to the occurrence of the external events.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

The present invention in the form of one or more exemplary embodiments will now be described. In the following description, numerous specific details are set forth in detail to provide a more thorough description of the invention. It will be apparent to one skilled in the art, however, that this invention can be practiced without these specific details. In other instances, well known features have not been described in detail so as not to unnecessarily obscure the invention.

Figure 1:
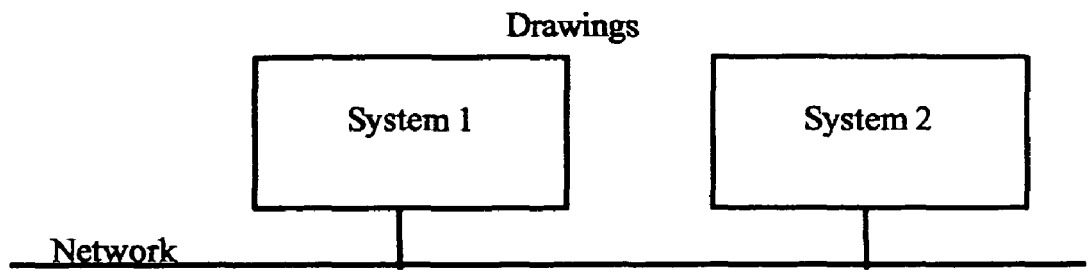
FIG. 1 is a simplified block diagram showing an example of a distributed computing environment.

Many of the real world systems have complex and dynamic behaviors. A behavior is complex because there are lots of elements involved. A behavior is dynamic because it evolves or changes over time. One guiding principle to model complex and dynamic behavior is to divide and conquer. The present invention uses Dynamic Systems (DS's) and subordinate DS's (sub-DS's) to divide and any complex and dynamic behavior that may be present in a wide range of software or hardware systems in a real time or distributed environment as in FIG. 1 as well as real world entities, such as people and organizations.

Figure 2:
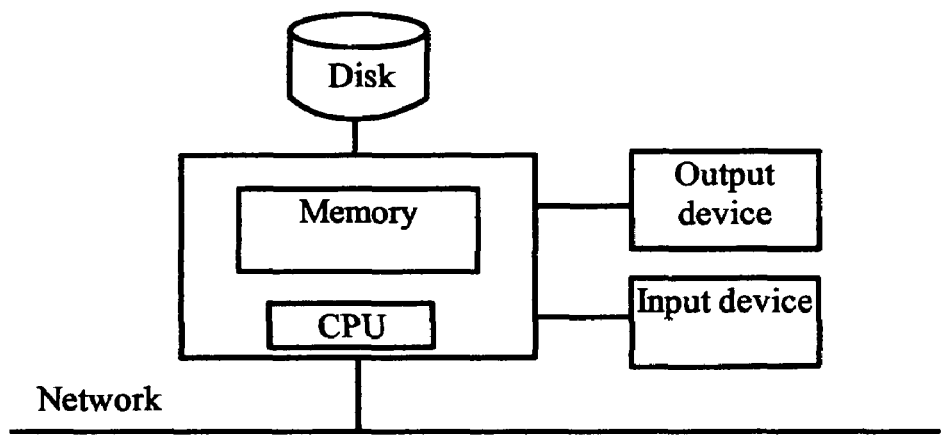
FIG. 2 is a simplified block diagram illustrating a computer system that can be used to implement the present invention.

A distributed environment typically is made up of multiple hardware systems connected by a network. Each hardware system has a central processing unit (CPU), memory (ROM, RAM, and disks), and input and output devices as in FIG. 2.

The hardware system is a computer, which may be a Personal Data Assistant, a laptop, a desktop, a workstation, a mainframe, a real time control device, a networked equipment, or any of a variety of other devices providing computing and input/output capabilities.

In the present invention, types (or classes) and instances are differentiated. A type or class is a design time concept that specifies some behavior properties of an entity, whereas an instance is a run time entity whose behavior property is defined by a particular class. Unless explicitly described as a class, a term in the present invention typically refers to an instance.

Specifying Dynamic Behavior Using the DS

In order to divide complex system behavior into smaller components, this invention borrows the idea from a common sense that the universe we live in has two fundamental dimensions, namely time and space. Along the time dimension, a composite system can be divided into sequential sub-DS's, while along the space dimension, a composite system can be divided into parallel sub-DS's. At any point in time and space, a DS can be decomposed into multiple sequential sub-DS's and multiple parallel sub-DS's. Each sub-DS may also be further decomposed into its own sub-DS's along these two dimensions.

Figure 3:
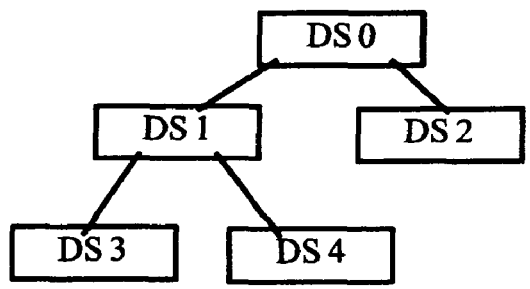
FIG. 3 is a DS containing a tree of sub-DS's.

In general, a DS may contain a set of sequential sub-DS's and a set of parallel sub-DS's. Since each of these sub-DS's may have its own sub-DS's, a DS typically contains a tree of sub-DS's. An intermediate DS in this tree can be viewed as a super-DS with regard to its sub-DS's, and as a sub-DS with regard to its super-DS. Hence, a DS may be called a DS, a super-DS or a sub-DS depending on the context it is referred to. For example, as shown in FIG. 3, DS0 is a super-DS of DS1 and DS2. Hence, DS1 is a sub-DS of DS0. However, DS1 is also a super-DS of DS3 and DS4.

When specifying the behavior of a system in an interconnected world, both external and internal readiness need to be considered. Typically, a particular action can be performed only when both the system itself is ready and certain external conditions are met. The present invention also reflects these interdependencies among systems.

A DS can be either simple or composite. A simple DS (FIG. 4) has a Behavior and a Result. The Behavior describes the behavior of a DS and the Result may be used by the Behavior to record the final outcome after the behavior is completely performed. An exemplary Behavior may specify that when a certain condition is met, the DS performs a particular action.

Figure 4:
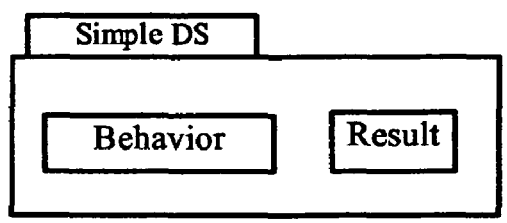
FIG. 4 is a simple DS.

Note that in FIG. 4 The simple DS is shown as a box with a label on the top. Components are shown as smaller boxes inside of the containing box. This is the convention used in this document.

Figure 5:
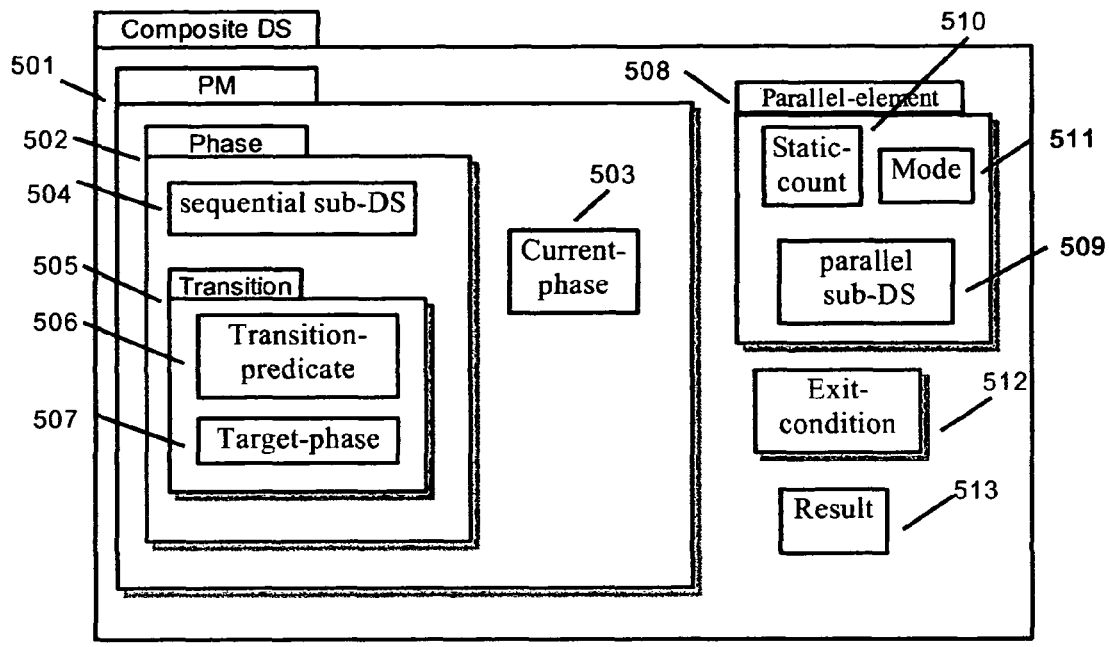
FIG. 5 is a composite DS.

A composite DS (FIG. 5) has following components:
zero or more Phased Machines (PM's) 501 that represent the sequential part of behavior of the composite DS.
Each PM has one or more Phases 502 and a Current-phase 503.
When a PM becomes active, one of its Phases becomes active. While the PM is active, its Phases are being activated and deactivated according to their Transition specifications. In general, while the PM is active, at most one of its Phases can be active.
A normal Phase has a sequential sub-DS 504 and zero or more Transitions 505.
The sequential sub-DS contains the behavior of the Phase. It can be either a simple or composite DS.
Each Transition has a Transition-predicate 506 and a Target-phase 507.
When a Current-phase subsequently becomes inactive, another Phase is selected to become active. A Transition specifies that if its Transition-predicate is evaluated as true, its Target-phase is the next phase to become active after the transition. The Transition-predicate may use information in the Result of the sequential sub-DS or any other information available to it at run time for the evaluation.
The Target-phase in any Transition must refer to one of the Phases in the same PM. In other words, transition cannot go beyond the boundary of a PM. Note that a particular Phase can be the target of more than one other source Phases. In addition, cyclical transitions are allowed, including transitioning to Current-phase itself. This is how a repetitive behavior can be specified.
Since at most one Phase can be active at any time, all those Transition-predicates of the same source Phase must be mutually exclusive.
the Current-phase is a pointer or reference to the currently active Phase in the PM at run time.
For setting the Current-phase, a PM may have two kinds of special phases.
One special phase is the Initial-phase. A PM can have at most one Initial-phase. The Initial-phase is used to select the first Phase to become active when the PM becomes active. This Initial-phase has a dummy null sequential sub-DS and a list of initial Transitions.
Another special phase is the Null-phase. When the Current-phase of a PM refers to a Null-phase, the entire PM has became inactive. A PM may have zero or more user defined Null-phases and a default Null-phase. A Null-phase is a phase without any sub-DS nor Transition defined. It only has a unique ID that differentiates one Null-phase from another in a PM and the default Null-phase has a predefined unique ID that is different from any user defined Null-phase in the same PM. The ID of a Null-phase can be used by the Exit-condition or Exit-predicate (described below) to determine if a composite DS should exit or not.
zero or more Parallel-elements 508
Each Parallel-element has a parallel sub-DS 509 that represents part of the parallel behavior of the composite DS, an optional Static-count 510, and a Mode 511 that indicates whether the corresponding parallel sub-DS is active or inactive at run time.
The optional Static-count is a number that indicates how many static instances of the parallel sub-DS is to be created when its containing composite DS is created. If no Static-count is specified, the default value of Static-count is 1 and one instance of the parallel sub-DS is always created when its containing composite DS is created. In addition to these statically created instances, other instances of the parallel sub-DS may be dynamically created by a user defined Behavior at run time. Dynamically created sub-DS's are called dynamic sub-DS's, whereas those sub-DS's created along with its super-DS are called static sub-DS's. The dynamic sub-DS is useful when the number of instances of a parallel sub-DS is not known at design time, but can only be found out at run time.

When a parallel sub-DS becomes active at run time, its Mode is set as "active". When the parallel sub-DS becomes inactive at run time, its Mode is set as "inactive".

When a composite DS becomes active, all its parallel sub-DS instances become active.

Each of these parallel sub-DS's can be either simple or composite.

Figure 6:
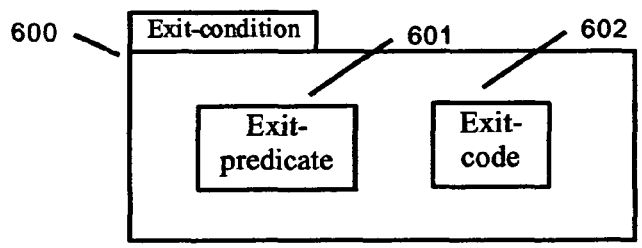
FIG. 6 shows an Exit-condition comprising a pair of explicit Exit-predicate and corresponding Exit-code.

An Exit-condition set 512 with zero or more Exit-conditions, where each Exit-condition 600 specifying a condition under which the entire composite DS should become inactive and exit. Each Exit-condition comprises a pair of explicit Exit-predicate 601 and its corresponding Exit-code 602 (FIG. 6). The Exit-predicate can be specified as a logical expression, a mathematical formula or symbol, or a description in text. The Exit-code is unique among all Exit-codes within the same Composite DS. It is typically a number that is either generated by a design tool or specified by a designer. When one Exit-predicate is tested to be true at run time, the composite DS exits and its corresponding Exit-code is recorded in the Result of the composite DS to indicate under which condition the composite DS exits. Alternatively, the Exit-condition set can be specified by defining an exit function, which is either a procedure or function of a functional programming language or a method of an object-oriented programming language. The exit function uses a list of implicit Exit-predicates internally to decide whether any Exit-condition is met or not at run time, and returns the corresponding Exit-code to indicate which particular Exit-predicate that is evaluated as true.

One exemplary Exit-predicate is that when any PM or parallel sub-DS exits, the composite DS exits.

Another exemplary Exit-predicate is that when one particular parallel sub-DS exits, the composite DS exits.

If no Exit-condition is specified in the Exit-condition set, the default Exit-condition is that when all PM's and all parallel sub-DS's become inactive, the containing composite DS becomes inactive and a predefined default Exit-code is recorded in the Result. This default Exit-condition is always in effect in any composite DS.

a Result 513 for the entire composite DS. The Result records the Exit-code returned by the exit function, or, if an Exit-condition set is specified, it records the Exit-code whose corresponding Exit-predicate is evaluated as true.

Note that if more than one instance of a particular component is allowed, the component is shown in the diagram with a shade. For example, within a composite DS, there can be a number of PM's and Parallel-elements, and within a PM, there can be one or more Phases, which may have a number of Transitions. Hence, each of PM, Parallel-element, Phase and Transition is shown with a shade as in FIG. 5.

Many real world systems display different behavior as time passes. To model the changes of behavior over time, some part of a DS is activated and deactivated as time passes and only the active part of the DS is in effect at any point in time. Hence, the way to control the changing behavior is by controlling when to activate and deactivate sub-DS's within a DS.

Figure 7:
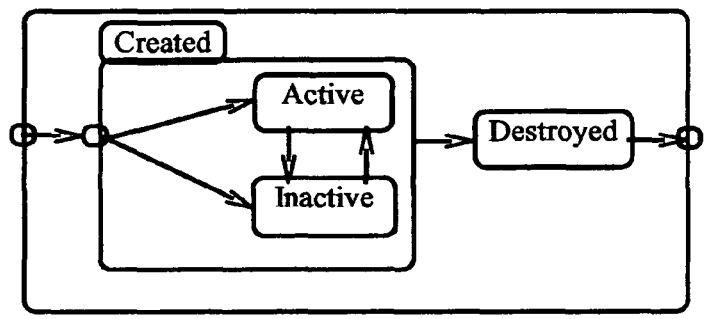
FIG. 7 is the general life cycle of a DS.
Figure 8:
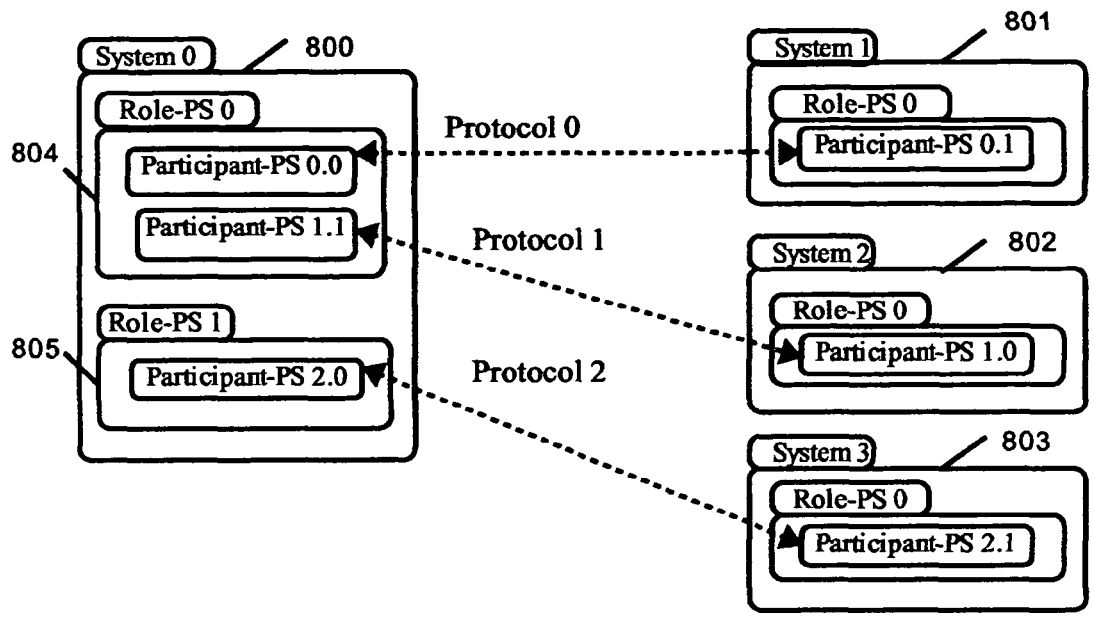
FIG. 8 shows Protocol, Participant-PS and Role-PS.

The general life cycle of a DS (FIG. 7) is that after it is created, it may become either active or inactive. An active DS becomes inactive when its behavior completes or ends. A DS (either active or inactive) can be destroyed when it can no longer become active again. In FIG. 7, a rectangle box represents a phase, and a phase may have a label (such as "Created") attached to it. An arrow represents a transition from one phase to another. A small empty rectangle on the boarder represents an Initial-phase or a Null-phase, which indicates that the DS does not exist (either before it is created or after it is destroyed). A phase may contain sub-phases. For example, the "Created" phase contains "Active" and "Inactive" sub-phases.

A DS instance as specified by a DS type can be created by loading relevant code and data into memory or a persistent storage device at run time. However, the exact procedures for creation and destruction of a DS is not essential to this invention, hence, is left for a run time platform, which is an embodiment of this invention that executes DS or DS derived models, to decide. The run time platform only needs to ensure that after a DS instance is created, all its static components are created and the DS and all its components are ready to be activated and deactivated until the DS is finally destroyed. Specific activation and deactivation procedures of a DS are described below.

The run time platform performs following activation and deactivation procedure of a simple DS (FIG. 4):

When a simple DS becomes active, its Behavior is performed.

After its Behavior is performed, the outcome is recorded in the Result, and the simple DS subsequently becomes inactive.

The run time platform also performs following activation and deactivation procedure of a composite DS (FIG. 5):

When a composite DS becomes active, all its PM's and static Parallel-elements become active.

When a Parallel-element becomes active, its parallel sub-DS becomes active and its Mode is set as "active".

When a PM becomes active, one of its Phases (including its sequential sub-DS) becomes active.

The first active Phase is selected in the follow way. If there is only one Phase in the PM, that Phase is selected as the Current-phase to become active. Otherwise, one of the Phases must be the Initial-phase, which is required for the selection procedure. The Transition-predicates of these initial Transitions are evaluated when a PM becomes active. If one Transition-predicate is evaluated as true, its associated Target-phase is selected as the next Current-phase to become active after the transition.

When a Sequential or parallel sub-DS (either simple or composite) becomes active, the same behavior described here for either simple or composite DS is repeated recursively for that sub-DS.

When a parallel sub-DS subsequently becomes inactive, its corresponding Mode is set as "inactive".

When a sequential sub-DS subsequently becomes inactive, its Phase becomes inactive and its Transition-predicates are evaluated. When one Transition-predicate is evaluated as true, its associated Target-phase (may be a dummy Null-phase) is the next phase to become active after the transition and the Current-phase is changed to the Target-phase. If no Transition-predicate is evaluated as true, the default is to change the Current-phase to the default Null-phase.

When the Current-phase is changed to a Null-phase, the entire PM becomes inactive.

Whenever any PM or Parallel-element becomes inactive, the Exit-condition set is evaluated. If a set of Exit-predicate and Exit-code pair is explicitly specified (FIG. 6) in an Exit-condition set, whenever an Exit-predicate is evaluated to be true, its corresponding Exit-code is recorded in the Result and the composite DS becomes inactive. If an exit function is specified, it tests each Exit-condition, and if any Exit-condition is met, an appropriate Exit-code is recorded in the Result and the composite DS becomes inactive. Otherwise, the composite DS remains active.

When a composite DS becomes inactive, all its PM's (along with their active sequential sub-DS's) and Parallel-elements (along with their parallel sub-DS's) become inactive.

Repetitive behavior may be specified in a repetitive Phase. A repetitive Phase is a Phase that has itself as the Target-phase in one of its Transitions.

In the present invention, recursive DS's are supported. A recursive DS has one or more sub-DS's with the same type or class as itself or one of its direct or indirect super-DS's. With recursive DS's, the same behavior typically repeats recursively in ever smaller scopes. The recursion is usually terminated by a choice that no further recursive sub-DS would be required.

The benefits of using DS for dynamic behavior modeling are that
- its composition structure directly reflects the fact that we live in a universe with both time and space dimensions and that these dimensions are orthogonal to each other;
- Viewing things in both time and space dimensions is natural to human minds. It also adds significant meaning on top of a bunch of nodes and links typically defined in many existing behavior specification techniques. Hence, it is easy to learn and comprehend;
- By activating and deactivating various sub-DS's, the behavior of a DS can evolve over time in a well controlled way;
- The Exit-condition set with a number of Exit-predicates and Exit-codes provides a powerful and flexible mechanism to control when a composite DS should exit;
- Unlike many existing behavior specification techniques with fork and join nodes, the containment box of a composite DS maintains a clean life cycle boundary for all its components.
- Since each sub-DS in a composite DS can be composite, it supports recursive specifications of behavior in ever refined details;
- By supporting repetitive phases and dynamic parallel sub-DS's, repetitive behavior and dynamic behavior can also be specified.

Specialization of DS into Ext-DS, PS, Int-DS

Although DS is a very powerful tool to describe dynamic behavior, to fully specify the behavior of an application system that interacts with multiple peer systems in a distributed environment, we need three kinds of specialization of a DS. One is the External DS (Ext-DS) that is used to specify external activities, including incoming messages and events, that an application system must deal with. The second one is the Internal DS (Int-DS) that is used to specify internal activities that an application system performs to get some work done. The third one is the Proactive System (PS) to combine Ext-DS and Int-DS for specifying the reactive and proactive behavior of an application system.

External DS (Ext-DS)

An Ext-DS defines what incoming external events a PS waits for before performing some internal actions.

Figure 9:
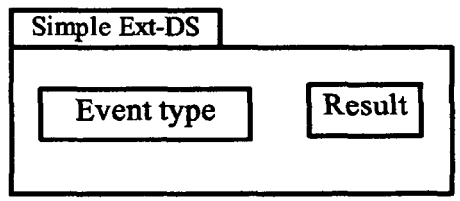
FIG. 9 is a simple Ext-DS.

An Ext-DS is a specialization of DS, and it can be either simple or composite. As a specialization of a simple DS, a simple Ext-DS (FIG. 9) has an Event type as its Behavior, and a Result. The Event type specifies the type of a signal, message or event that may be received by a PS. An Event type may be specified in one of the following: 1) a programming language, such as C and Java®, 2) a data specification notation, such as Abstract Syntax Notation One, 3) an XML-based notation, or 4) a graphical notation.

The run time platform performs following activation and deactivation procedure of a simple Ext-DS:
- When a simple Ext-DS becomes active, its Event type becomes active.
- When a message specified by its Event type occurs on a connection subsequently, the event is matched. The message is saved for use later and the simple Ext-DS becomes inactive. Otherwise, the message is dropped and the simple Ext-DS remains active.

A composite Ext-DS is the same as a composite-DS (FIG. 5) except that each of sub-DS is replaced by a sub-Ext-DS and any of these sub-Ext-DS's (sequential or parallel) can be either simple or composite.

Since a composite Ext-DS is a specialization of a composite DS, the activation and deactivation procedure of a composite Ext-DS is identical to the activation and deactivation procedure of a composite DS as described previously with each "DS" replaced by an "Ext-DS".

When a simple PS receives an incoming event at run time, it calls an event matching procedure Matching( ) to check if the event matches a valid event type in its Ext-DS or not. The Matching procedure returns one of the following:
- no-match, indicating that there is no match;
- partial-match, indicating that there is a match, the event is saved for processing later, but the Ext-DS has not exited, since more events are expected by the Ext-DS; or
- full-match, indicating that there is a match, the event is saved for processing later, and the Ext-DS has exited.

An exemplary run time Matching procedure of an active Ext-DS is described in the following pseudo code, where "Ext-DS" is the Ext-DS that specifies incoming external events to receive, and "event" is the incoming event to be checked. Note that comments are included in between an opening '[' and a closing ']'.

```
Matching (Ext-DS, event) {
If the Ext-DS is simple,
    Checks if the event is the same type as specified in Event type or not;
    If no, return "no-match";
    Else [the event is the right type ],
        Save the event;
        return "full-match";
Else [the Ext-DS is composite],
    [Check all PM's]
    For each PM whose Current-phase is not null, do the following:
        recursively calls itself for the sequential sub-Ext-DS;
        If it returns "partial-match", return "partial-match"
        Else, if it returns "full-match",
```

```
        check each Transition one at a time;
            If any Transition-predicate is "true",
                change the Current-phase to the Target-phase;
            Else [if none of these Transition-predicates is true],
                change the Current-phase to the default Null-phase;
            If the Current-phase is not a Null-phase,
                return "partial-match";
            Else [the Current-phase is a Null-phase],
                check the Exit-condition set;
                If any Exit-condition is met,
                    record the Exit-code in Result;
                    return "full-match";
                Else [No Exit-condition is met],
                    return "partial-match";
        Else [returns "no match"], go check the next PM;
    [If it reaches here, all PM is "No match", go check all Parallel-elements]
    For each active Parallel-element,
        recursively call itself for the parallel sub-Ext-DS;
        If it returns "partial-match", return "partial-match";
        Else, if it returns "full-match",
            set Mode as "inactive";
            check the Exit-condition set;
            If any Exit-condition is met,
                record the Exit-code in Result;
                return "full-match";
            Else [No Exit-condition is met], return "partial-match";
        Else [returns "no match"], go check the next parallel-element;
    [If it gets here, there is no match in all sequential and parallel sub-Ext-DS's,] return
    "no-match";
}
```

Figure 12:
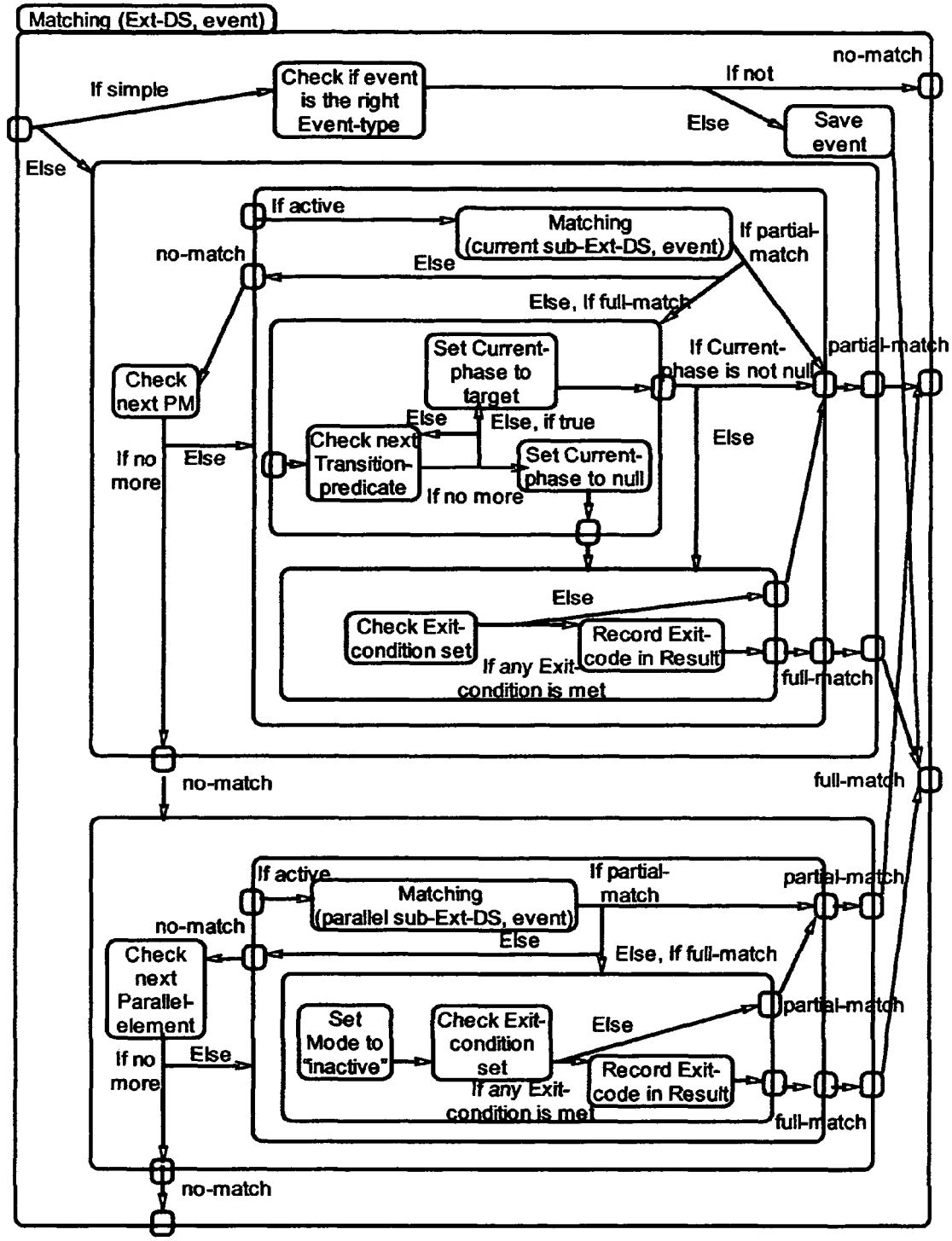
FIG. 12 shows the matching procedure pseudo code in a graphical notation

For clarification purpose, the event matching procedure is also shown in FIG. 12 using the graphical notation described later in this invention.

Internal DS (Int-DS)

Once triggered by a full match of Ext-DS, the corresponding Int-DS in a simple PS is performed. Hence, an Int-DS is viewed as the active part of the behavior or active behavior of the PS.

Figure 11:
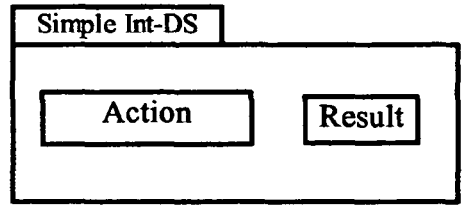
FIG. 11 is a simple Int-DS.

An Int-DS is a specialization of DS, and it can be either simple or composite. As a specialization of a simple DS, a simple Int-DS (FIG. 11) has an Action as its Behavior, and a Result. The Action is the most basic unit of behavior that is not further broken down to smaller components in the current invention. It can be reading or writing a piece of information, searching or matching, accessing data in events saved by an Ext-DS, building or sending out events, creating or destroying dynamic DS instances, or invoking a complex actions performed by others. An Action can be implemented as a procedure of a functional language, such as C, a method of an object-oriented language, such as Java®, or a script of a script language, such as Shell in Linux. An Action may also be implemented as a fragment of code in a script language, a programming language, a byte code, such as Java® byte code, or even in an assembly language. The Result may be used by the Action to record the outcome of its execution.

The run time activation and deactivation procedure of a simple Int-DS is as follows:

When a simple Int-DS becomes active, its Action becomes active and is performed.

After the Action is performed, the simple Int-DS subsequently becomes inactive.

A composite Int-DS is the same as a composite DS (FIG. 5) except that each sub-DS is replaced by a sub-Int-DS, and any of these sub-Int-DS's (sequential or parallel) can be either simple or composite.

Since a composite Int-DS is a specialization of a composite DS, the activation and deactivation procedure of a composite Int-DS is identical to the activation and deactivation procedure of a composite DS as described previously with each "DS" replaced by an "Int-DS".

When a simple PS receives an incoming event at run time, it calls an event matching procedure to check if the event matches a valid event type in its Ext-DS or not. If there is a full match, the simple PS calls an action performing procedure Act ( ) to perform internal activities as defined in its Int-DS. The Act procedure returns one of the following:

error, indicating that there is an error; or

OK, indicating that internal activities have been successfully performed.

An exemplary run time Act procedure for an active Int-DS is described in the following pseudo code, where "current-DS" is the Int-DS that defines the internal activities to be performed.

```
Act (Int-DS) {
If the Int-DS is simple,
    Perform the Action to process saved events;
    If there is error detected, return "error";
    Else, return "OK";
Else [the Int-DS is composite],
    [Check all PM's]
    For each PM whose Current-phase is not null, do the following:
        Recursively call itself for the sequential sub-Int-DS ;
        If it returns "error", return "error";
        Else, check each Transition;
            If any Transition-predicate is "true",
                Change the Current-phase to the Target-phase;
            Else, change the Current-phase to default Null-phase;
        If Current-phase is not null, repeat this for the (new) Current-phase;
        Else,
            Check the Exit-condition set;
            If any Exit-condition is met,
                record the Exit-code in Result;
                return "OK";
            Else, go check the next PM;
    [Check all Parallel-elements]
    For each active Parallel-element,
        Recursively call itself for the parallel sub-Int-DS;
        If it returns "error", return "error";
```

Else,
    set Mode as "inactive";
    check the Exit-condition set;
    If any Exit-condition is met,
        record the Exit-code in Result;
        return "OK";
    Else, go check the next Parallel-element;
}

Figure 14:
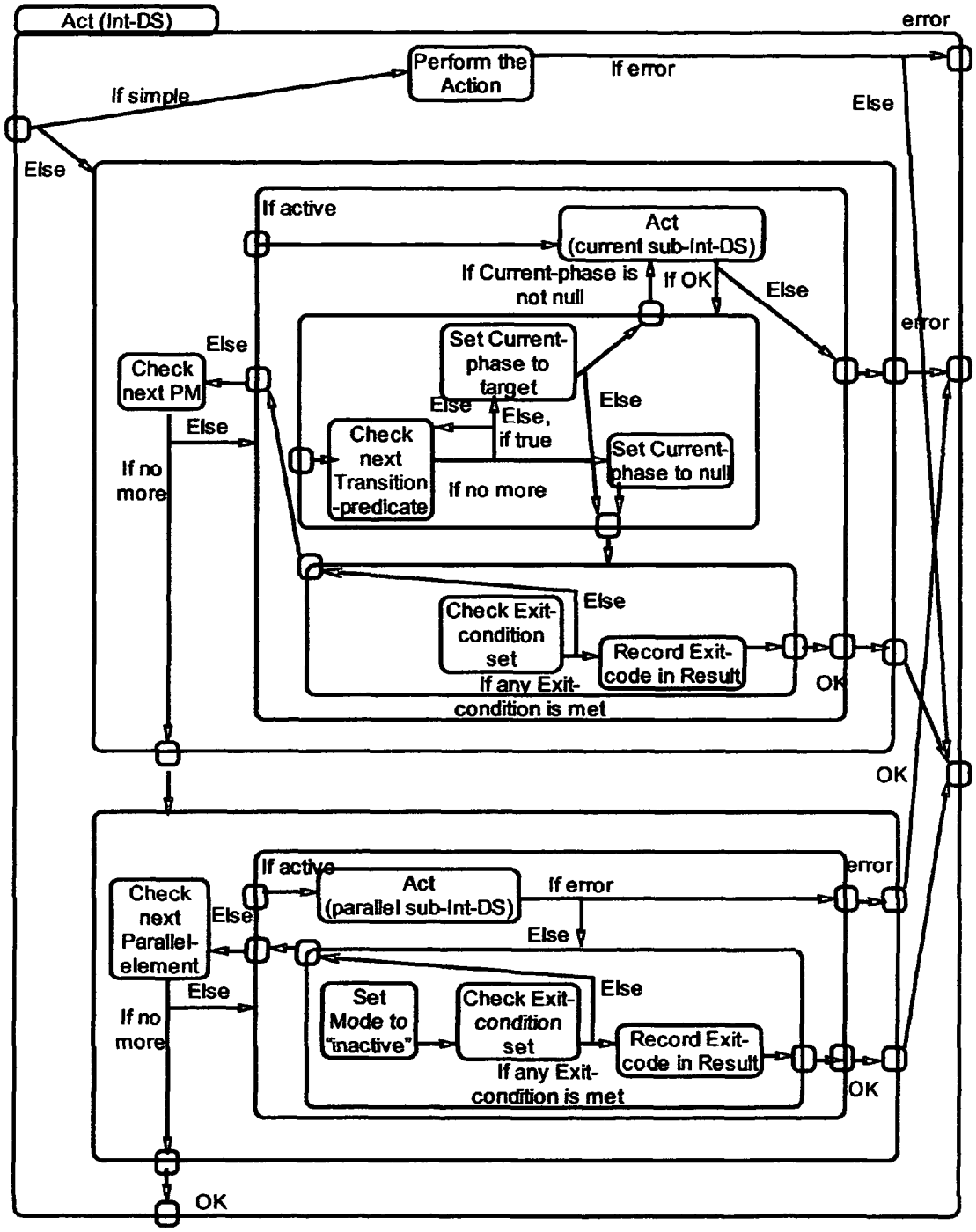
FIG. 14 shows the act procedure pseudo code in a graphical notation

For clarification purposes, the action performing procedure is also shown in FIG. 14 using the graphical notation described later in this invention.

PS

An application system with a reactive behavior that is triggered by external interactions or events can be defined as a PS.

Figure 10:
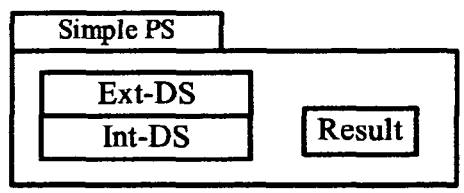
FIG. 10 is a simple PS.

A PS is a specialization of DS, and it can be either simple or composite. As a specialization of a simple DS, a simple PS (FIG. 10) has a Behavior that includes an External DS (Ext-DS) followed by an Internal DS (Int-DS), and a Result. The Ext-DS specifies external events to occur and the Int-DS specifies internal actions to perform in response to the occurrence of external events defined in the Ext-DS. Each of Ext-DS and Int-DS can be either simple or composite. The Result may be used by the Int-DS to record the outcome of performance of its actions.

The run time activation and deactivation procedure of a simple PS is as follows:
    When a simple PS becomes active, its Ext-DS becomes active.
    When its Ext-DS subsequently has a full match (to be described later), its Int-DS becomes active and is performed.
    After the Int-DS is performed, the simple PS subsequently becomes inactive.

A composite PS is the same as a composite DS (FIG. 5) except that each sub-DS is replaced by a sub-PS and any of these sub-PS's (sequential or parallel) can be either simple or composite.

Since a composite PS is a specialization of a composite DS, the activation and deactivation procedure of a composite PS is identical to the activation and deactivation procedure of a composite DS as described previously with each "DS" replaced by a "PS".

When a PS receives an incoming event at run time, it calls a React procedure to handle the event. The React procedure returns one of the following:
    nothing-done, indicating that no internal activity is done;
    partial, indicating that part of internal activities are done, but the PS has not exited yet; or
    done, indicating that internal activities are done and the PS has exited.

An exemplary run time React procedure of an active PS upon receiving an event is described in the following pseudo code, where "PS" is the reacting PS and "event" is the event to process.

React (PS, event) {
If the PS is simple,
    Call the Matching procedure for its Ext-DS with the event;
    If the result is "no-match", return "nothing-done";
    Else if the result is "partial-match", return "partial";
    Else [the result is "full-match"],
        call Act procedure to perform the Int-DS;
        return "done";

Else [PS is composite],
    [Check all PM's]
    For each PM whose Current-phase is not null, do the following:
        recursively call itself for the sequential sub-PS;
        If it returns "partial", return "partial";
        Else if it returns "done", check each Transition;
            If any Transition-predicate is "true",
                change the Current-phase to the Target-phase;
            Else [no Transition-predicate is true],
                change the Current-phase to default Null-phase;
            If the Current-phase is not null, return "partial";
            Else [the Current-phase is null],
                check the Exit-condition set;
                If any Exit-condition is met,
                      record the Exit-code in Result;
                      return "done";
                Else [No Exit-condition is met],
                      return "partial";
        Else [returns "nothing-done"], go check the next PM;
    [If it reaches here, all PM is "nothing-done", go check all Parallel-elements]
    For each active Parallel-element,
        Recursively call itself for the parallel sub-PS ;
        If it returns "partial", return "partial";
        Else if it returns "done",
            set Mode as "inactive";
            check the Exit-condition set;
            If any Exit-condition is met,
                record the Exit-code in Result;
                return "done";
            Else [No Exit-condition is met], return "partial";
        Else [returns "nothing-done"], go check the next parallel-element;
    [If it reaches here, nothing is done] return "nothing-done";
}

Figure 13:
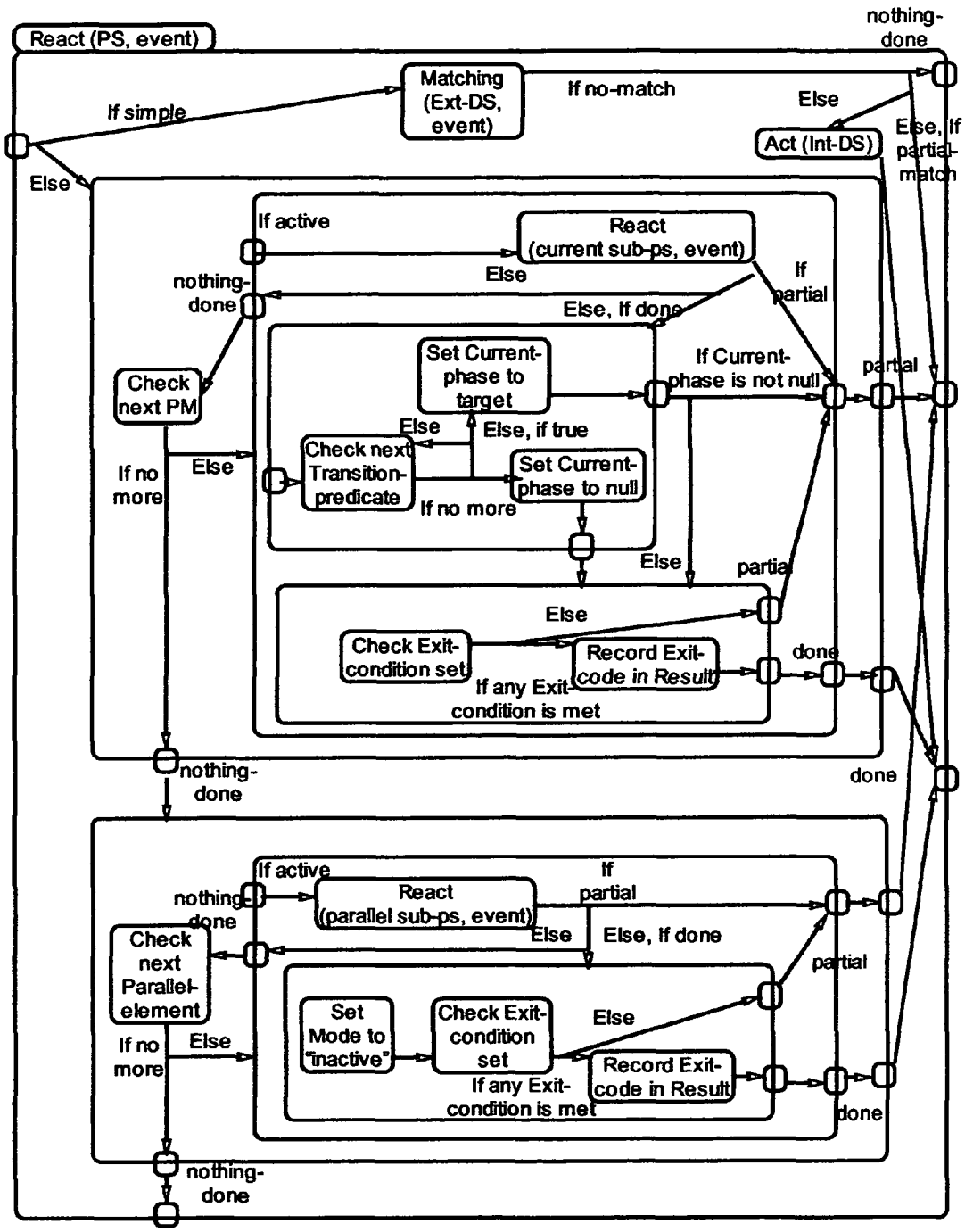
FIG. 13 shows the react procedure pseudo code in a graphical notation

For clarification purpose, the reactive procedure is also shown in FIG. 13 using the graphical notation described later in this invention.

Using Ext-DS, PS and Int-DS, which are specializations of DS, in various steps instead of using the more general DS has many additional benefits. They are:
    Ext-DS, PS and Int-DS provide layers of abstraction to facilitate defining complex system behavior in a distributed environment, since each one is specialized in a way to help the designer to focus on a particular aspect of the system behavior.
    PS is a useful extension and improvement over the conventional state machine based techniques, such as Statechart, whereas Int-DS is a useful extension and improvement over conventional flow chart based techniques, such as BPMN and UML 2.0 Activity diagram.
    Since each of them is a specialization of the same DS, there is strong consistency in each layer of design to make the present invention easy to learn and to understand.

Simplified Model of DS, Ext-DS, PS, and Int-DS

So far the basic model of DS and its specializations, such as Ext-DS, PS, and Int-DS, have been described. Together, they are referred to as the DS model in the present invention. This basic DS model (referred to as "model 0" hereafter) may be simplified by emulating each Parallel-element by a Parallel PM. The simplified model is referred to as "model 1" hereafter.

Figure 15A:
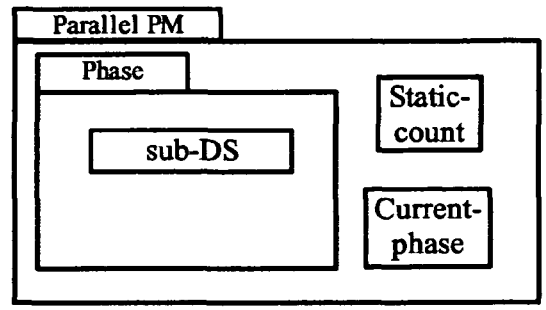
FIG. 15A is a Parallel PM with zero Transition to emulate a Parallel-element.
Figure 15B:
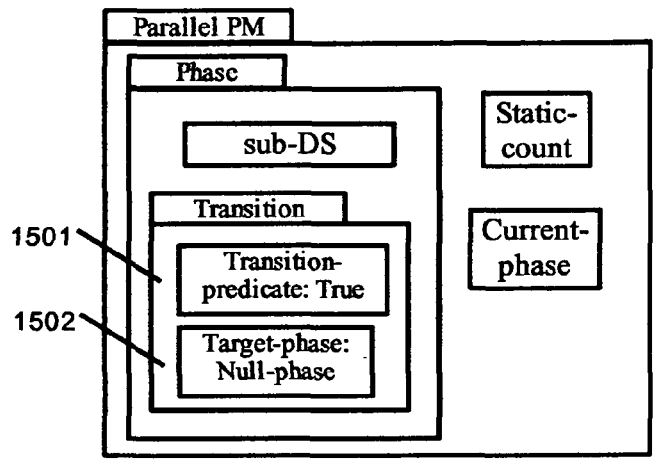
FIG. 15B is a Parallel PM with only one Transition to emulate a Parallel-element.

A Parallel-element in a composite DS of model 0 can be emulated by a PM with only one Phase with a dummy Transition. The PM that emulates a Parallel-element is called a "Parallel PM" in the present invention. The Phase in a Parallel PM has only one sub-DS. Its dummy Transition may be implemented as one of the following:
    no Transition is defined as shown in FIG. 15A;
    there is only one Transition, which is marked as null;

there is only one Transition with its Transition-predicate set to be true 1501 and its Target-phase pointing to a Null-phase 1502 as shown in FIG. 15B.

A new optional component Static-count 1604 is added to the PM. Like the Static-count in a Parallel-element, the Static-count in a PM indicates how many static instances of the PM type should be created when its containing DS is created. If no Static-count is specified, the default value of Static-count is 1 and one instance of the PM type is always created when its containing DS is created.

The sub-DS of such a Parallel PM would have the same behavior as the parallel sub-DS of the Parallel-element that the PM is emulating.

In the present invention, the term "Sequential PM" is used when referring to a full-fledged PM without the above-mentioned limitations of a Parallel PM. A Sequential PM's Static-count may be set to 1 so that one static instance of the Sequential PM is created when its containing composite DS is created.

Figure 16:
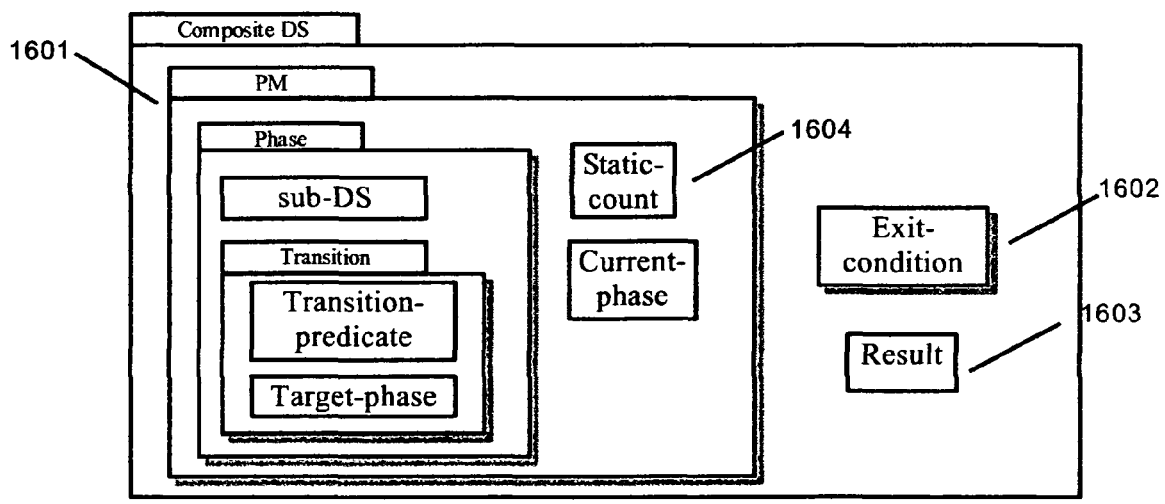
FIG. 16 is a model 1 composite DS.

Using a Parallel PM to emulate each Parallel-element in a composite DS, a model 1 composite DS has a number of PM's 1601, an Exit-condition set 1602 and a Result 1603. Some of these PM's are Sequential PM's and others are Parallel PM's (FIG. 16).

Since each Parallel-element is emulated by a PM, the procedure for activation and deactivation of a composite DS of model 1 is the same as model 0 except that the part of code that deals with a Parallel-element is not executed, since there is no Parallel-element defined in a composite DS.

Similarly, a composite Ext-DS, PS, or Int-DS can be a specialization of model 1 composite DS's. Since each Parallel-elements are now replaced by a parallel PM, the procedure for activation and deactivation of each of these model 1 DS components is the same as model 0 except that the part of code that deals with a Parallel-element is not executed. Similarly, the event matching procedure for an active Ext-DS of model 1, the action performing procedure for an active Int-DS of model 1, and the reactive procedure for an active PS of model 1 as described earlier are all still applicable.

Graphical Notation

One exemplary embodiment of the present invention is to represent PS, Ext-DS, Int-DS or any other DS derived components (all of these are referred to as "DS components" hereafter) in a human readable graphical notation.

As an example for this graphical notation, a DS or a sub-DS can be shown as either a containment box or a containment box with a label attached to it. The containment box can be in many shapes, such as a polygon, a circle, or an oval. A super-DS containing a number of sub-DS's (either Sequential or Parallel) can be shown as a large containment box (the super-DS) containing a number of sub-containment boxes (both sequential and parallel sub-DS's) within its boundary. If the DS can have multiple instances, it is shown with a shade. An Initial-phase or a Null-phase can be shown as a small box or a symbol at the boarder of the composite DS box.

Figure 17:
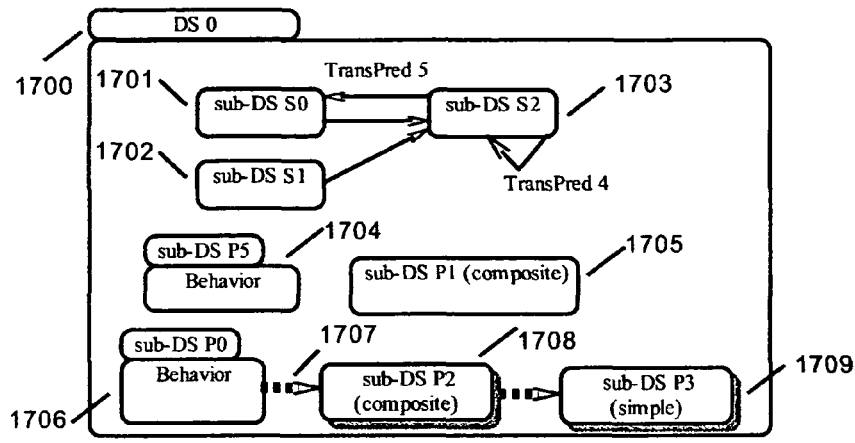
FIG. 17 is an exemplary graphical notation of a DS example.

FIG. 17 depicts an exemplary graphical notation of an example composite DS "DS 0" 1700 with three sequential sub-DS's ("sub-DS s0" 1701, "sub-DS s1" 1702, and "sub-DS s2" 1703), three parallel simple sub-DS's ("sub-DS p0" 1706, "sub-DS p3" 1709 and "sub-DS p5" 1704), and two parallel composite sub-DS's ("sub-DS p1" 1705 and "sub-DS p2" 1708). Note that each of "sub-DS p2" 1708 and "sub-DS p3" 1709 is shown with a shade indicating that it may have more than one instance at run time.

In this example, a simple DS is shown as a rectangle box with the name or a short description of its Behavior inside of the box. "sub-DS p0" 1706 and "sub-DS p5" 1704 in FIG. 17 are two simple DS examples.

A Transition can be shown as a link or arrow (called Transition arrow) with its Transition-predicate (TransPred) close to it as its label, and the arrow points to its Target-phase. For example, in FIG. 17, there is a Transition arrow from "sub-DS s2" 1703 to "sub-DS s0" 1701 (the Target-phase) with "TransPred 5" as the label for the Transition. Any sub-DS with at least one Transition arrow (incoming or outgoing) is a sequential sub-DS, whereas a sub-DS without any Transition arrow is a parallel sub-DS.

A Creation arrow can be used to point to a dynamic component that is created dynamically. Although a Creation arrow is shown as a thick dashed line arrow 1707 in FIG. 17 as an exemplary graphical notation, it can be represented by another kind of link as long as it is visually distinctive from a Transition arrow. As shown in FIG. 17, "sub-DS p0" 1706 can create multiple instances of "sub-DS p2" 1708 dynamically, and "sub-DS p2" 1708 can create multiple instances of "sub-DS p3" 1709 dynamically. A parallel sub-DS, such as "sub-DS p2" 1708 and "sub-DS p3" 1709 in FIG. 17, with an incoming creation arrow is a dynamic parallel sub-DS whose corresponding Static-count in Parallel-element is set to 0, whereas a parallel sub-DS, such as "sub-DS p0" 1706 and "sub-DS p1" 1705 in FIG. 17, without an incoming creation arrow is a static one with its Static-count typically set to 1 indicating that one instance should be created when "DS 0" 1700 is created.

Note that "DS 0" 1700 in FIG. 17 does not explicitly specify any Exit-condition. As described earlier, the default Exit-condition is that "DS 0" 1700 exits when all its sub-DS's have exited.

Figure 18:
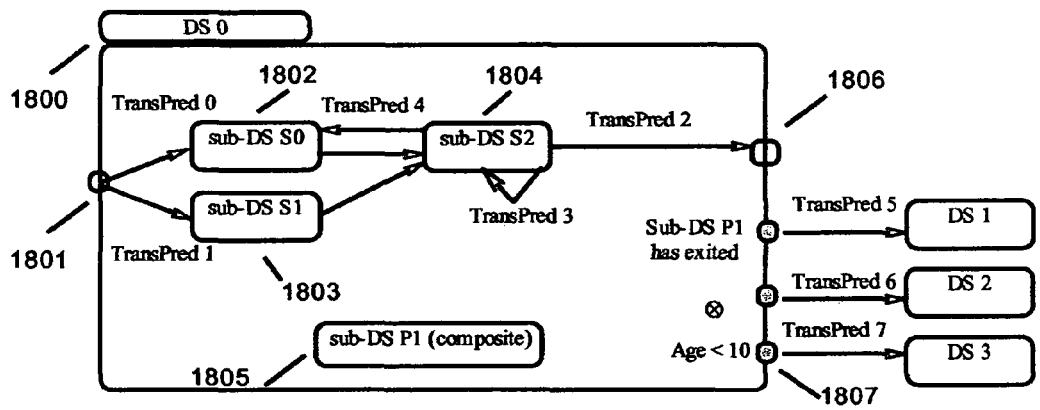
FIG. 18 is another exemplary graphical notation of a DS.

FIG. 18 shows how Initial-phases, Null-phases, Exit-predicates and Exit-points can be explicitly represented visually. In FIG. 18, the Initial-phase 1801 is shown as a small box at the left boarder. It has one Transition to the Phase containing "sub-DS s0" 1802 and another Transition to the Phase containing "sub-DS s1" 1803. "sub-DS s0" 1802 has a Transition to "sub-DS s2" 1804 and its Transition-predicate is always true. "sub-DS s2" 1804 has one Transition ("TransPred2" in FIG. 18) leading to a Null-phase 1806, a Transition "TransPred 3" leading to itself, and another "TransPred 4" leading back to the Phase containing "sub-DS s0" 1802. "DS 0" also contains a parallel "sub-DS p1" 1805 and two Exit-points.

Each exit-point represents an Exit-condition that indicates the condition under which a composite DS exits. An Exit-condition has a pair of Exit-predicate and Exit-code. An Exit-point can be shown as a symbol or a small box inside of or at the boundary of the containing composite DS box. As an example, each of these exit-points is shown in FIG. 18 as a small dark box 1807 at the boundary and labeled with its associated Exit-predicate.

An Exit-predicate can be shown as a text, a logical expression, or a mathematical formula describing a condition under which a composite DS exits. Exit-predicate "Sub-DS P1 has exited" is a text example indicating that when "sub-DS P1" exits, the composite DS "DS 0" 1800 exits. Exit-predicate "$\widehat{x}$" is an exemplary logical expression indicates that when all components exit, "DS 0" 1800 exits. Exit-predicate "Age<10" is an exemplary mathematical formula indicating that when a datum "Age" is smaller than 10, "DS 0" 1800 exits.

In order to simplify the behavior models and their graphical representations, following exemplary default cases are defined:

A Transition-predicate that is always true can be omitted.

If a Phase has only one incoming Transition that is connected from the Initial-phase and its Transition-predicate is always true, that Transition may be omitted completely.

If a Phase has only one outgoing Transition that is connected to a Null-phase and its Transition-predicate is always true, that Transition may be omitted completely.

Figure 19:
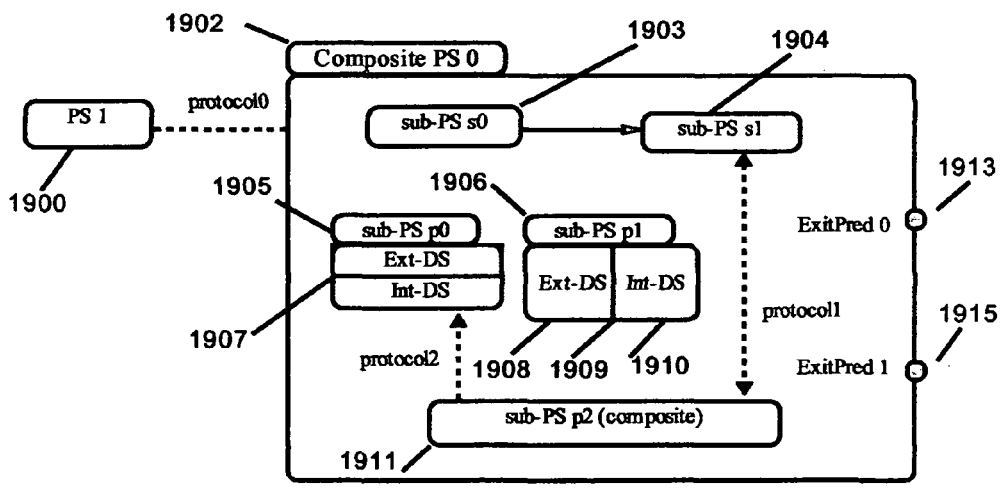
FIG. 19 is an exemplary graphical notation of a composite PS example.

FIG. 19 depicts an exemplary graphical representations of a composite PS example. In this exemplary diagram, "Composite PS0" 1902 contains two sequential sub-PS's, namely "sub-PS s0" 1903 and "sub-PS s1" 1904, three parallel sub-PS's, namely "sub-PS p0" 1905, "sub-PS p1" 1906, and "sub-PS p2" 1911, and two Exit-points 1913, 1915 with "ExitPred0" and "ExitPred1" as their respective Exit-Predicates.

A simple PS 1906 is shown as a box with its Ext-DS 1908 and Int-DS 1910 components inside. To differentiate an Ext-DS from an Int-DS in a simple PS, a divider (a vertical 1909 or a horizontal line 1907) is drawn in between the two components. "sub-PS p0" 1905 and "sub-PS p1" 1906 are two examples.

Interactions in between two PS's are bi-directional lines (called Interaction-links) connecting two participating PS's. FIG. 19 shows that the "composite PS 0" 1902 interacts with "PS 1" 1900, "sub-PS s1" 1904 interacts with "sub-PS p2" 1911 and "sub-PS p0" 1905 interacts with "sub-PS p2" 1911. In this particular example, an Interaction-link is shown as a dashed line ("protocol0" in FIG. 19 is such an example). However, it can be represented by another kind of link as long as it is visually distinctive from a Transition arrow and a Creation arrow. Optionally, one or two arrow heads can be used to indicate the direction of an interaction flow. A simple interaction with only one event sent is shown by a dashed line with only one arrow head ("protocol2" in FIG. 19 is such an example). An Interaction-link with arrow heads on both sides indicate a set of interactions that flow in both directions ("protocol1" in FIG. 19 is such an example). An Interaction-link can optionally have an associated label or identifier describing the protocol specification with which the interactions must comply. "protocol0", ""protocol1" and "procotol2" in FIG. 19 are such examples.

Figure 20:
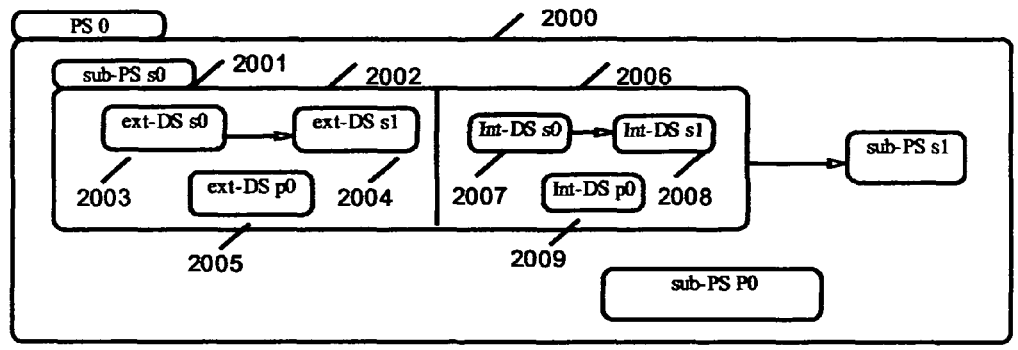
FIG. 20 shows an example composite PS containing a sub-PS with a composite Ext-DS and a composite Int-DS.
Figure 21:
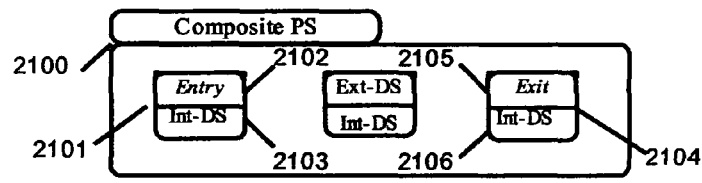
FIG. 21 is a composite PS with "Entry" and "Exit" predefined events.
Figure 22:
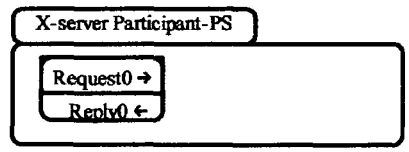
FIG. 22 X-server Participant-PS without predefined "Entry" event.

In the present invention, any sub-DS in a composite DS can be either simple or composite. Even the Ext-DS or Int-DS in a simple sub-PS can be either simple or composite. Therefore, a containment box may have a plurality of sub-containment boxes, wherein any of these sub-containment boxes may comprise a plurality of sub-sub-containment boxes. Some of these sub-sub-containment boxes are sequential, hence, are connected by Transition arrows. Some of these sub-sub-containment boxes are parallel, hence, are not connected to any other sub-sub-containment box. FIG. 20 shows an example composite PS "PS 0" 2000 containing a sub-PS "sub-PS s0" 2001 with a composite Ext-DS 2002 and a composite Int-DS 2006. The composite Ext-DS 2002 contains two sequential Ext-DS's, namely "ext-DS s0" 2003 and "ext-DS s1" 2004, and a parallel Ext-DS "ext-DS p0" 2005. The composite Int-DS 2006 contains two sequential Int-DS's 2007 and 2008, and a parallel Int-DS 2009.

Benefits of the graphical notation of a DS, Ext-DS, PS and Int-DS (for brevity, when referring to either DS, Ext-DS, PS or Int-DS, the term "system" is used here) are as follows:

A composite system is clearly shown with all its sequential and parallel components at the same time.

The containment box clearly shows that when a super-system becomes inactive or is destroyed, all its components become inactive or be destroyed.

Exit-points can clearly show how internal operations of a composite sub-system can affect how its super-system changes its current Phase.

Only essential elements of a composite system are shown. For example, PM's, Phases, and Parallel-elements are not shown in the diagram, since they are not critical in a diagram to understand the behavior. This greatly simplifies the graphical notation of a system specification.

The consistency among Ext-DS, PS and Int-DS diagrams makes it easier to learn and understand a specification of a complex behavior.

Note that the above descriptions use one particular way to represent DS, Ext-DS, PS, Int-DS and their components. However, based on the disclosure and teachings provided herein, it should be apparent to a person of ordinary skill in the art that various diagramming presentations may be used to represent the same mechanisms in accordance with the present invention as long as the following essences are preserved:

a composite DS is shown as a containment box containing its components, such as sequential sub-DS, parallel sub-DS, Initial-phase, Null-phase, exit-points, transition arrows, creation arrows and Interaction-links;

Each of these components inside of the composite DS box must be visually differentiated from each other;

A simple PS box contains an Ext-DS component and an Int-DS component and that they are visually differentiated from each other.

Implementation Issues

While some run time properties of a DS, Ext-DS, PS and Int-DS are frequently changed at run time, some static design time properties remain unchanged in its entire life time. In addition, there can be multiple instances of the same type at run time. Therefore, it makes sense to separate these design time properties in a class or type structure from run time properties in an instance structure.

Figure 24:
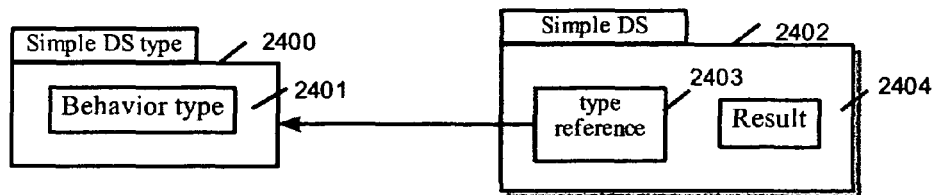
FIG. 24 shows type properties and instance properties of a simple DS.
Figure 25:
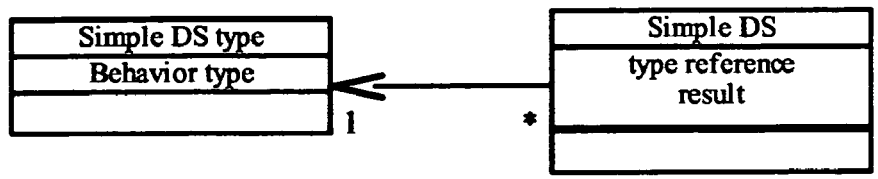
FIG. 25 shows type properties and instance properties of a simple DS in UML class diagram.

In one exemplary embodiment, the instance structure of a simple DS 2402 has a pointer or reference 2403 to its type structure 2400 and a Result component 2404 (FIG. 24). The type structure 2400 of a simple DS has one Behavior type component 2401. As shown in FIG. 24, there can be more than one simple DS instance sharing the same simple DS type. FIG. 25 shows the same simple DS type and instance structures in a UML class diagram.

Figure 26:
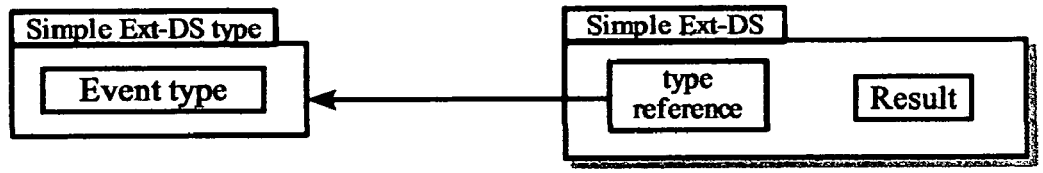
FIG. 26 shows type properties and instance properties of a simple Ext-DS.
Figure 27:
FIG. 27 shows type properties and instance properties of a simple Ext-DS in UML class diagram.

In one exemplary embodiment, the instance structure of a simple Ext-DS has a pointer or reference to its type structure and a Result component (FIG. 26). The type structure of a simple Ext-DS has one Event type component. As shown in FIG. 26, there can be more than one simple Ext-DS instance sharing the same simple Ext-DS type. FIG. 27 shows the same simple Ext-DS type and instance structures in a UML class diagram.

Figure 28:
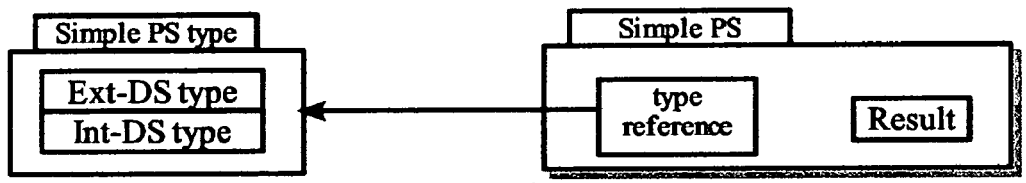
FIG. 28 shows type properties and instance properties of a simple PS.
Figure 29:
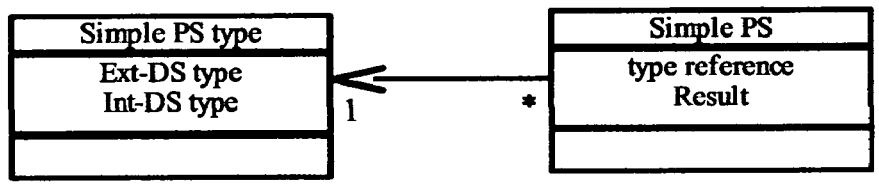
FIG. 29 shows type properties and instance properties of a simple PS in UML class diagram.

In one exemplary embodiment, the instance structure of a simple PS has a pointer or reference to its type structure and a Result component (FIG. 28). The type structure of a simple PS has one Ext-DS type (simple or composite) component and an Int-DS type (simple or composite) component. As shown in FIG. 28, there can be more than one simple PS instance sharing the same simple PS type. FIG. 29 shows the same simple PS type and instance structures in a UML class diagram.

Figure 30:
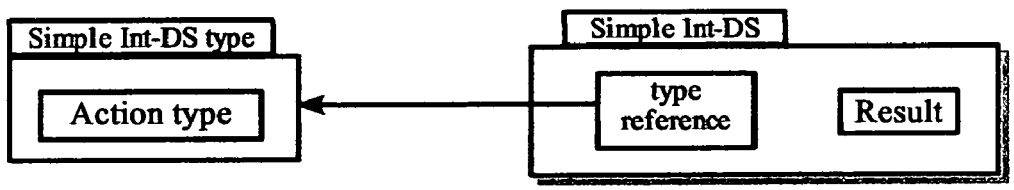
FIG. 30 shows type properties and instance properties of a simple Int-DS.
Figure 31:
FIG. 31 shows type properties and instance properties of a simple Int-DS in UML class diagram.

In one exemplary embodiment, the instance structure of a simple Int-DS has a pointer or reference to its type structure and a Result component (FIG. 30). The type structure of a simple Int-DS has one Action type component, which can be a code fragment, a procedure of a functional language, such as C, a method of an object-oriented language, such as Java®, or a script of a script language, such as Shell in Linux. As shown in FIG. 30, there can be more than one simple Int-DS instance sharing the same simple Int-DS type. FIG. 31 shows the same simple Int-DS type and instance structures in a UML class diagram.

Composite DS Type and Instance

Figure 32A:
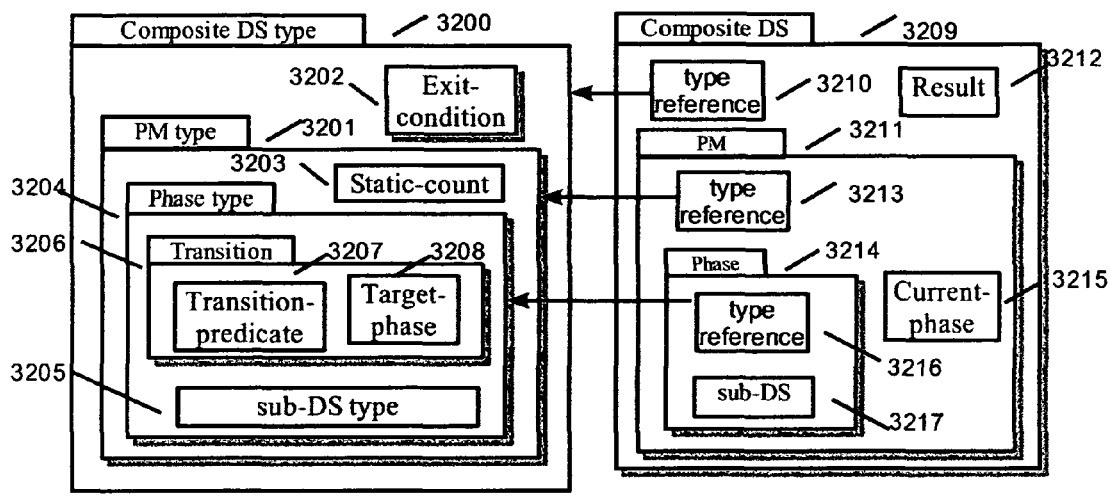
FIG. 32A shows model 1 composite DS type with an exit condition set and instance.
Figure 32B:
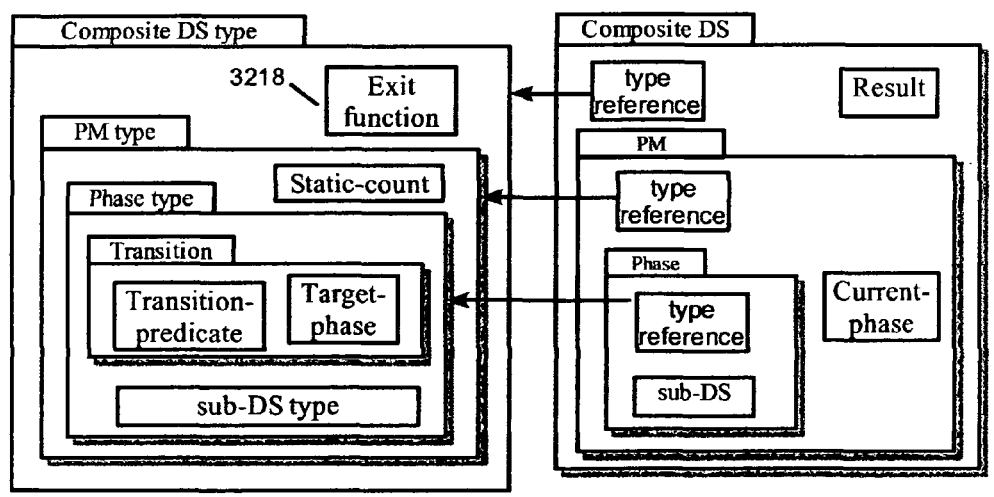
FIG. 32B shows model 1 composite DS type with an exit function and instance.

As shown in FIG. 32A, the composite DS type 3200 of model 1 has a number of Phased Machine (PM) types 3201, and either an Exit-condition set 3202 as in FIG. 32A or an exit function 3218 as shown in FIG. 32B. If an exit condition set is specified, it includes at least one exit condition, each exit condition including a pair of an exit predicate that specifies a condition under which an instance of the composite DS type exits and an exit code that identifies the associated exit condition. If an exit function is specified, the exit function returns an exit code that identifies a condition under which an instance of the composite DS type exits. Each PM type includes an optional Static-count 3203 and one or more Phase types 3204. Each Phase type has a sub-DS type 3205, and zero or more Transitions 3206. Each Transition includes a Transition-predicate 3207 and a Target-phase 3208. Each sub-DS type can be either a simple DS type or a composite DS type.

If a Static-count is specified in a PM type, it specifies the number of static instances of the PM type. If it is not specified, the default is that the PM type has one static instance.

Note that each PM type can be either a sequential PM or a parallel PM. As described earlier, a parallel PM type has only one phase type as shown in FIG. 15A and FIG. 15B.

The instance structure 3209 of a model 1 composite DS has a type reference 3210 to its DS type structure, a number of PM's 3211, and a Result 3212. Each PM has a type reference 3213 to its PM type structure, a number of Phases 3214, and a Current-phase 3215. Each Phase has a type reference 3216 to its Phase type structure, and a sub-DS instance structure 3217. The sub-DS instance can be either simple or composite. If it is simple 2402 as shown in FIG. 24, it includes a type reference 2403 to its associated simple DS type 2400 and a Result 2404 that records the outcome of performing the behavior 2401 of its associated simple DS type. If the sub-DS instance is composite, it has the same structure as 3209.

Note that the shade of the instance structure in FIGS. 32A, B and C indicates that there can be more than one composite DS instance sharing the same composite DS type.

Figure 35:
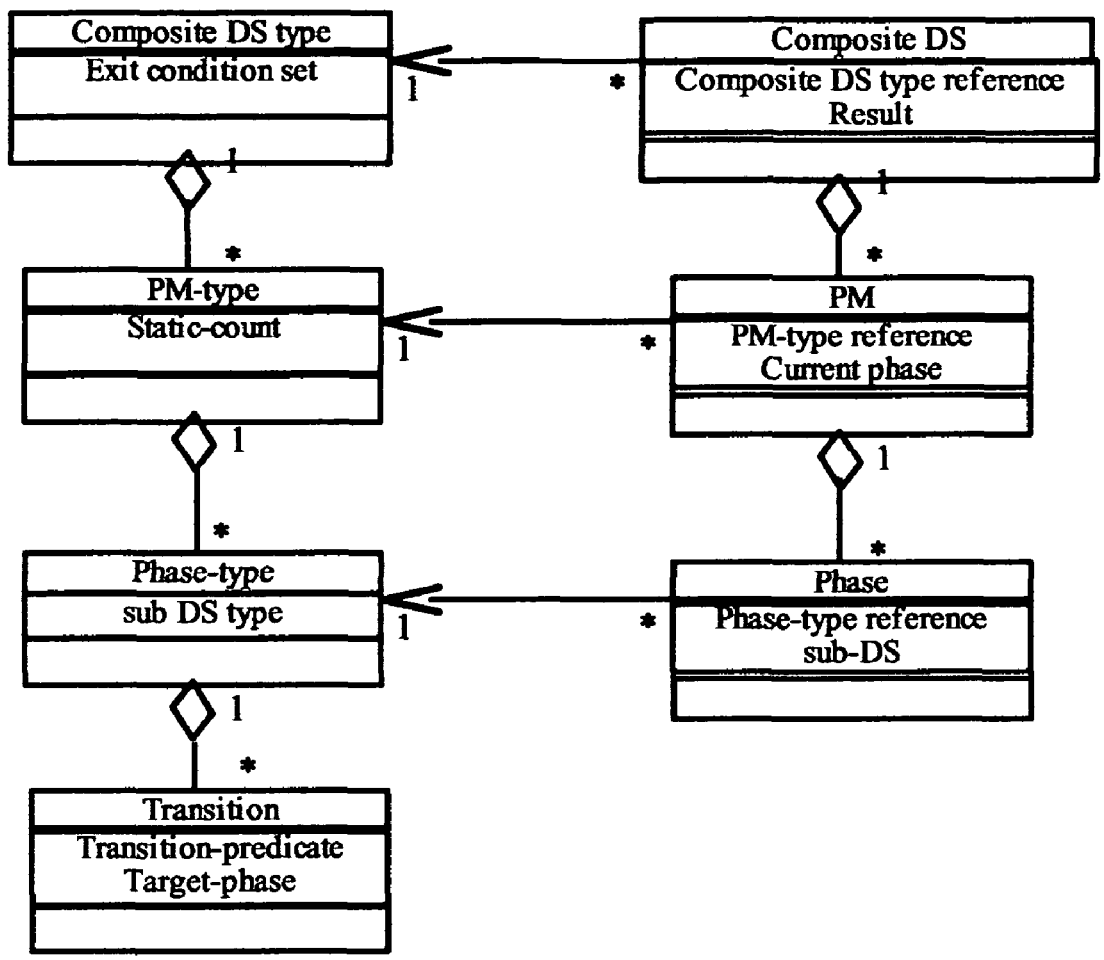
FIG. 35 shows type properties and instance properties of a composite model 1 DS in UML class diagram.

FIG. 35 shows the same composite-DS type and instance structures in a UML class diagram.

As a specialization of a composite DS of model 1, a composite Ext-DS of model 1 can be similarly separated into a type structure and an instance structure. The type structure of a composite Ext-DS of model 1 is identical to a composite DS type structure in FIG. 32A or 32B after replacing each "DS" with an "Ext-DS". The instance structure of a composite Ext-DS of model 1 is identical to a composite DS instance structure in FIG. 32A or 32B after replacing each "DS" with an "Ext-DS".

Figure 32C:
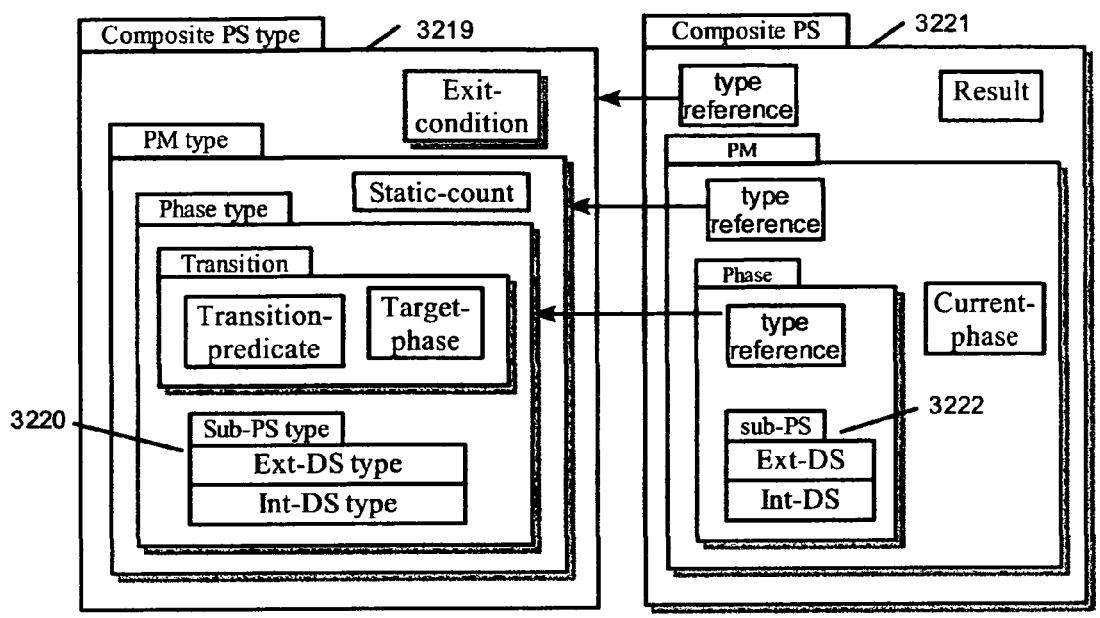
FIG. 32C shows model 1 composite PS type and instance.

As a specialization of a composite DS of model 1, a composite PS of model 1 can be similarly separated into a type structure and an instance structure. The type structure of a composite PS of model 1 is identical to a composite DS type structure in FIG. 32A or 32B after replacing each "DS" with a "PS". Note that the sub-PS type in a Phase type can be either simple or composite. FIG. 32C shows a composite PS type 3219 with a simple PS type 3220. The simple PS type includes an Ext-DS type that specifies external events to occur and an Int-DS type that specifies internal actions to perform in response to the occurrence of said external events.

The instance structure of a composite PS of model 1 is identical to a composite DS instance structure in FIG. 32A or 32B after replacing each "DS" with a "PS". Note that the sub-PS in a Phase can be either simple or composite. FIG. 32C shows a composite PS instance 3221 with a simple PS instance 3222. The simple PS includes an Ext-DS instance and an Int-DS instance.

Figure 23:
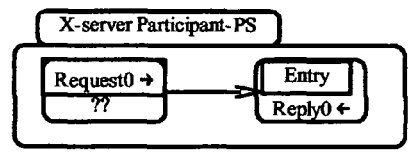
FIG. 23 X-server Participant-PS with a predefined "Entry" event.
Figure 36:
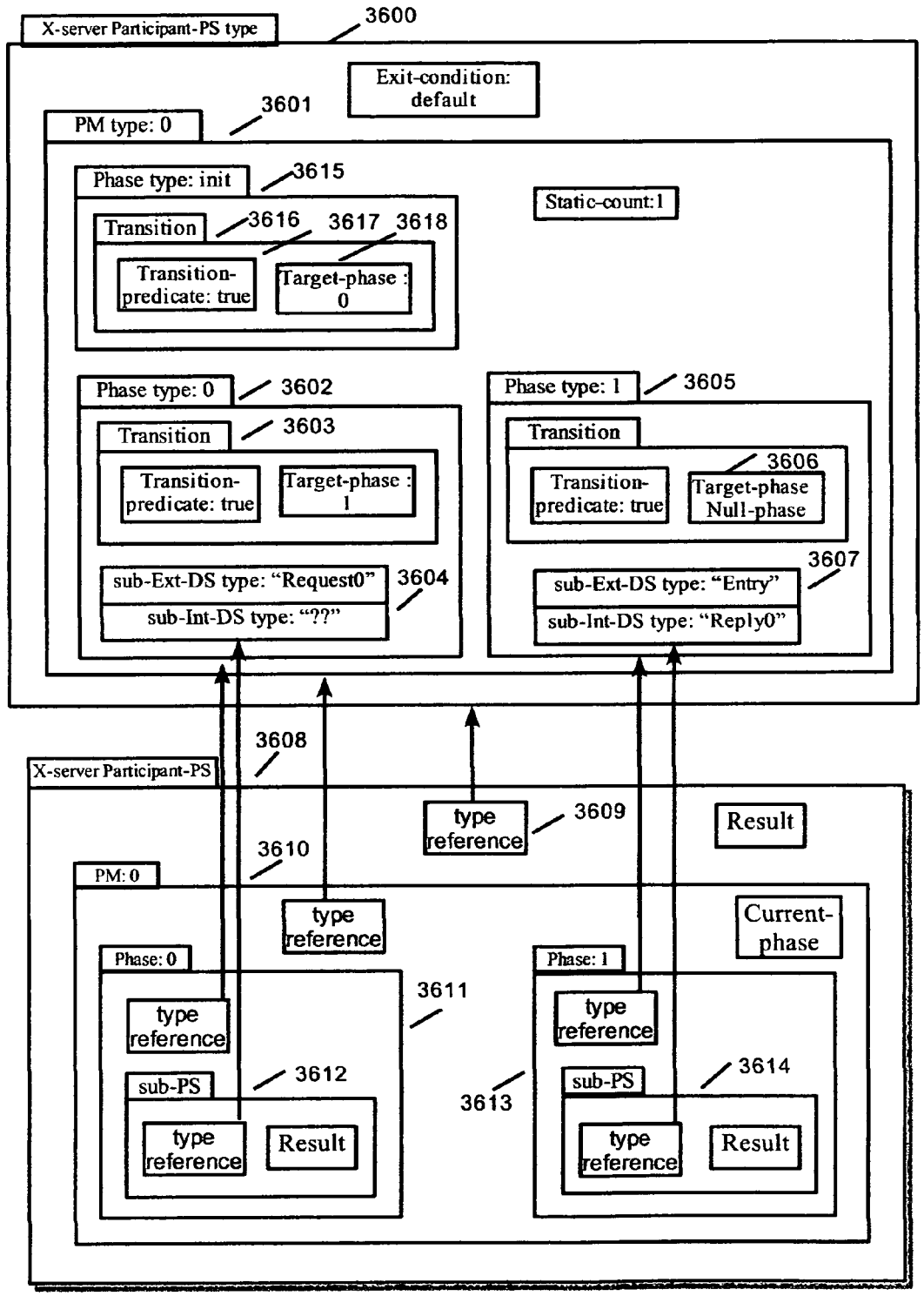
FIG. 36 shows the composite PS type and instance of X-server Participant-PS type of FIG. 23.
Figure 37:
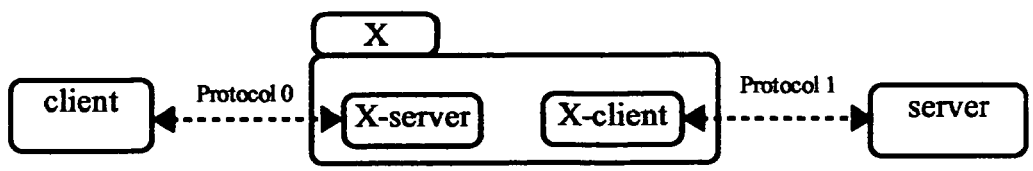
FIG. 37 shows a system "X" interacting with a client and a server.
Figure 38:
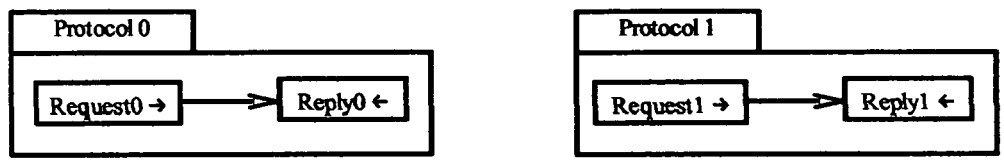
FIG. 38 shows exemplary Protocol "protocol 0" and "protocol 1"
Figure 39:
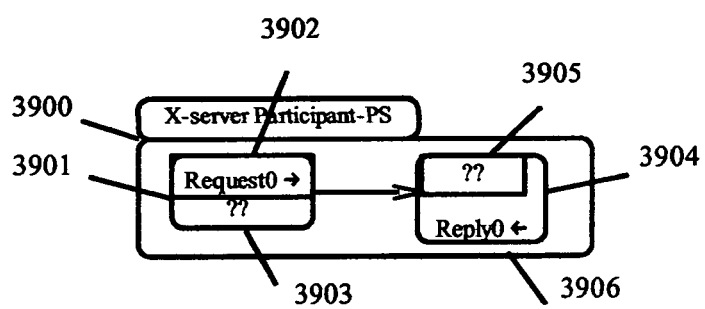
FIG. 39 is the Participant-PS for "X-server" derived from "protocol0" in FIG. 38.
Figure 40:
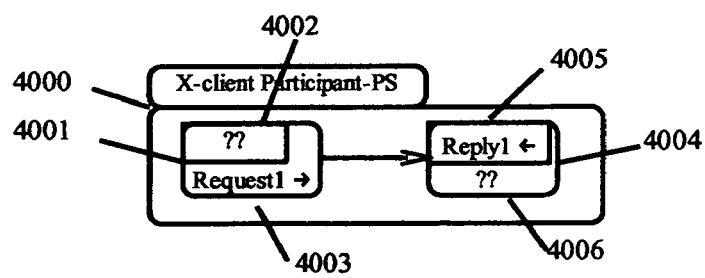
FIG. 40 is the Participant-PS for "X-client" derived from "protocol1" in FIG. 38.
Figure 41:
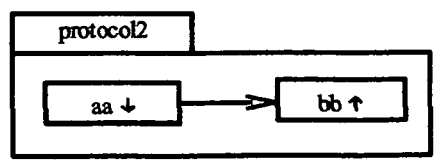
FIG. 41 is the Protocol "protocol2"
Figure 42:
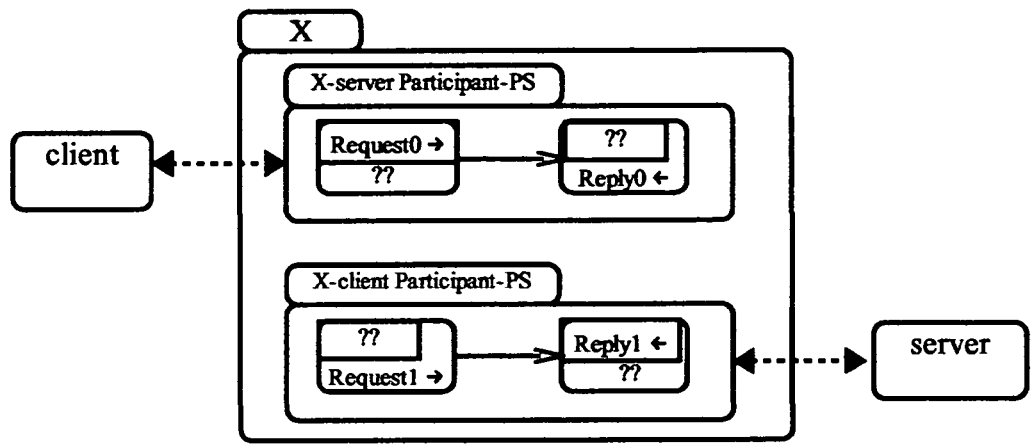
FIG. 42 shows how Participant-PS's are Combined into a Role-PS.
Figure 43:
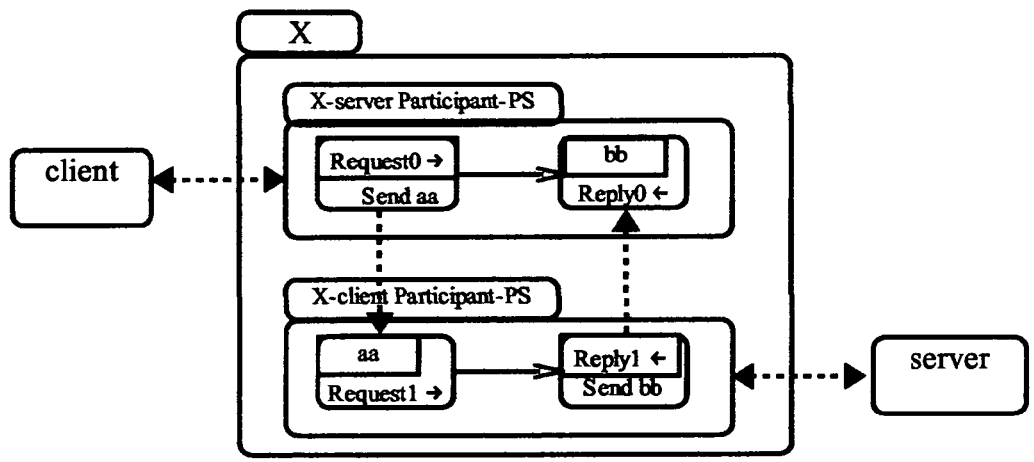
FIG. 43 shows how internal interactions and behavior are added.
Figure 44:
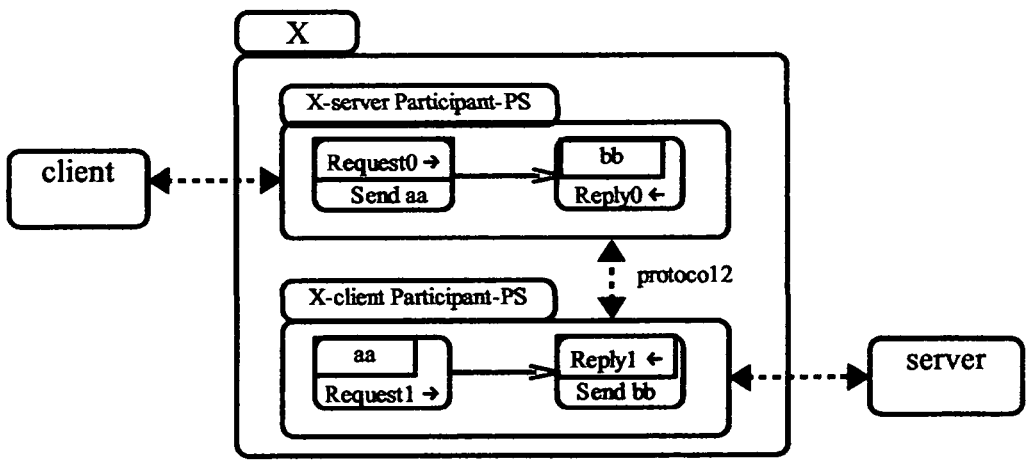
FIG. 44 is the Role-PS of "X" using a composite Protocol "protocol2"
Figure 45:
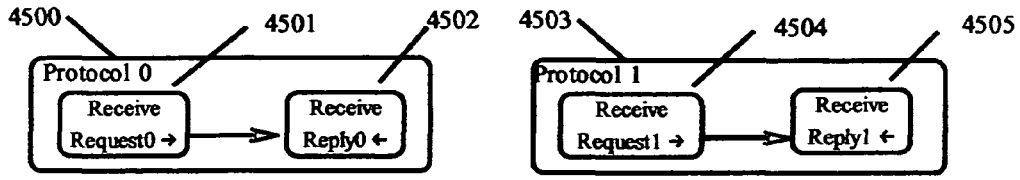
FIG. 45 shows "protocol 0" and "protocol 1" specified in UML Activity Diagram.
Figure 46:
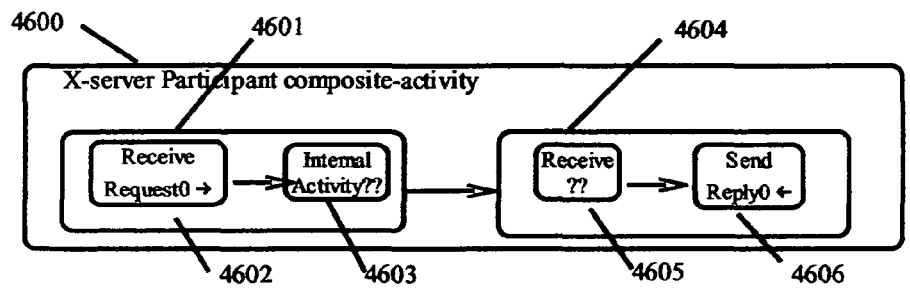
FIG. 46 shows "X-server" in UML Activity Diagram derived from "protocol0" in FIG. 45.
Figure 47:
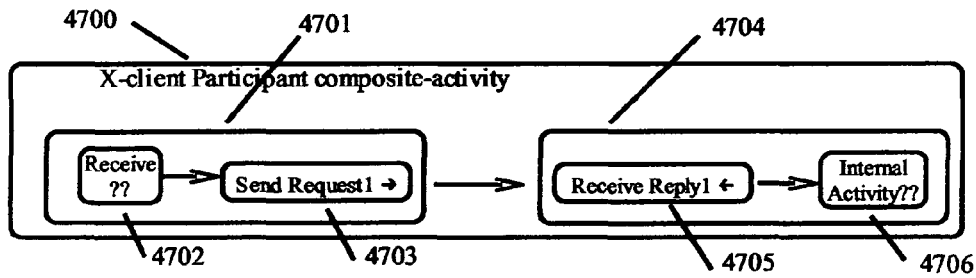
FIG. 47 shows "X-client" in UML Activity Diagram derived from "protocol1" in FIG. 45.
Figure 48:
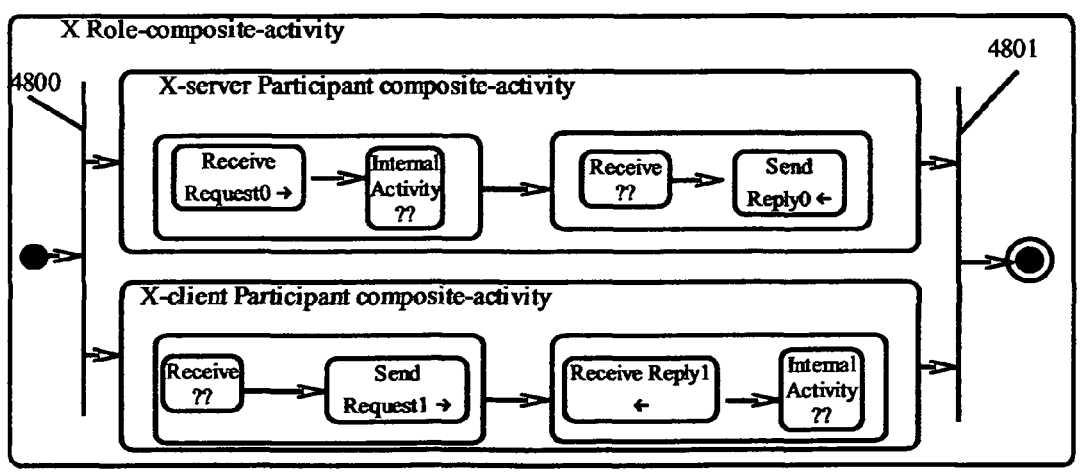
FIG. 48 shows that "X-server" and "X-client" are combined into a role composite-activity in UML Activity Diagram using a pair of fork and join nodes.
Figure 49:
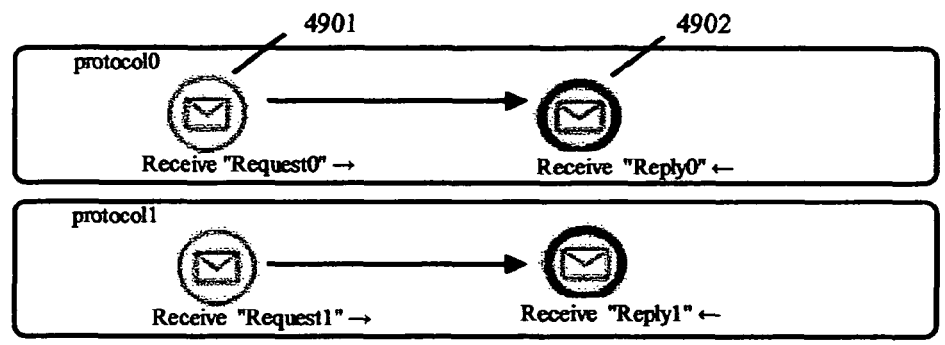
FIG. 49 shows "protocol 0" and "protocol 1" specified in BPMN.
Figure 50:
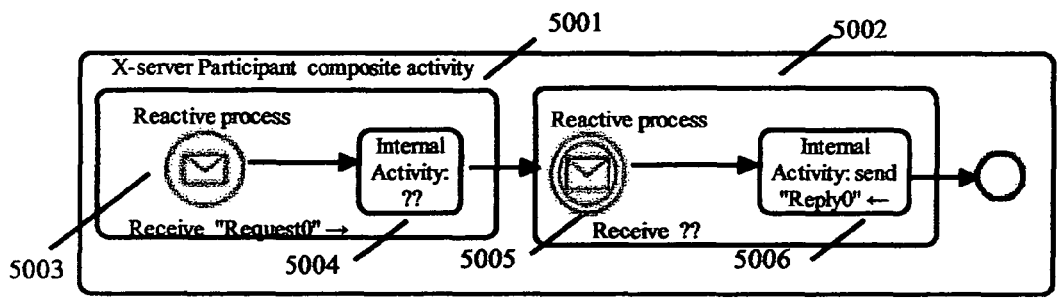
FIG. 50 shows "X-server" in BPMN derived from "protocol0"
Figure 51:
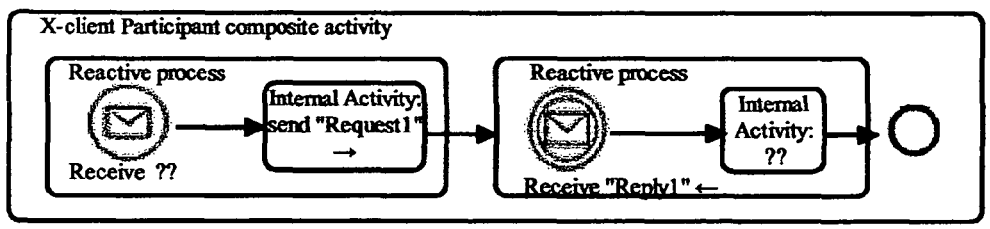
FIG. 51 shows "X-client" in BPMN derived from "protocol1"
Figure 52:
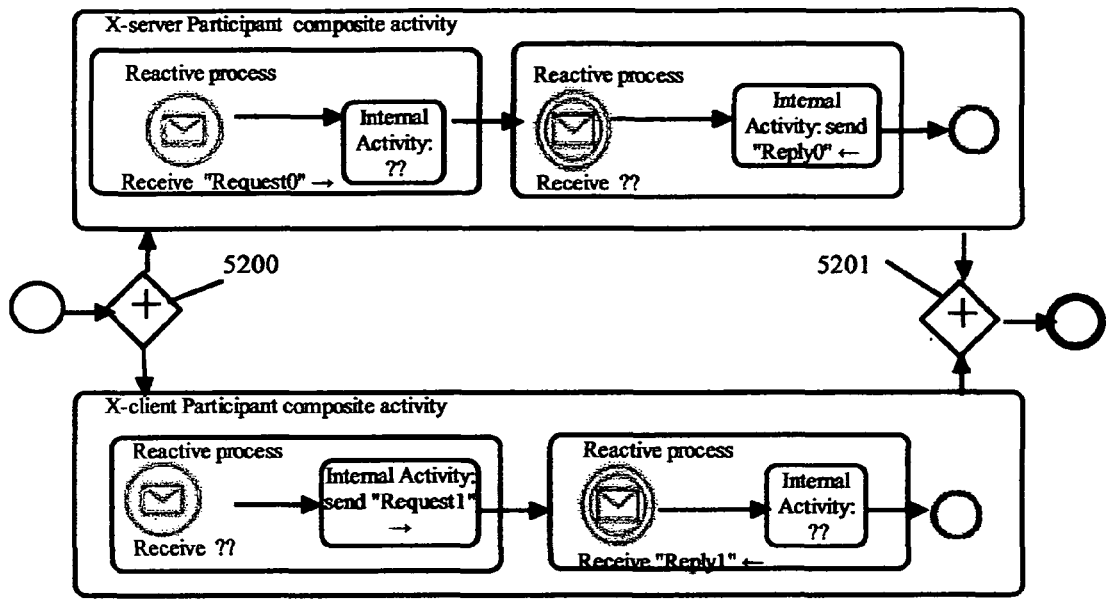
FIG. 52 shows that "X-server" and "X-client" are combined into a Role-PS in BPMN using a pair of fork and join parallel gateways.
Figure 53:
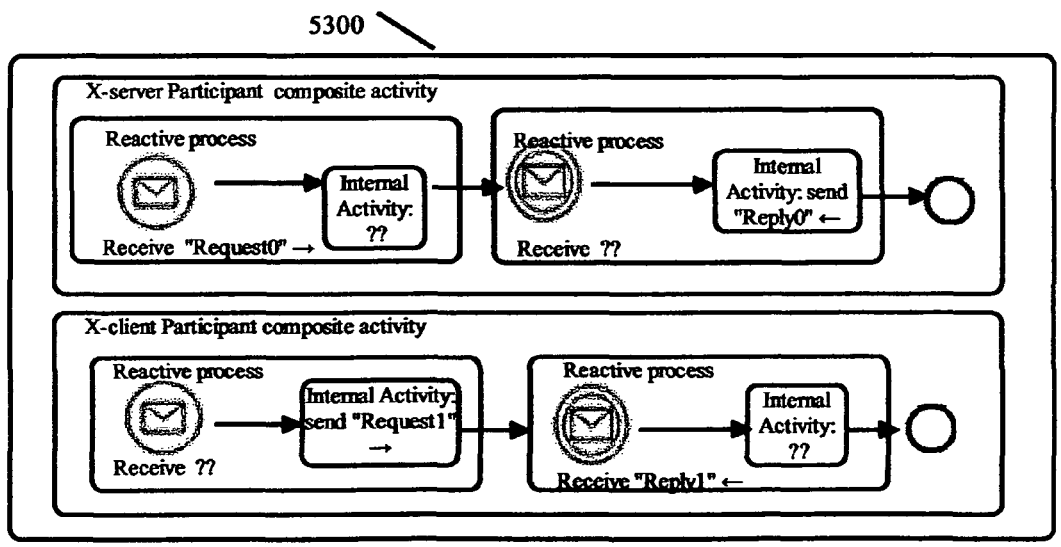
FIG. 53 shows that "X-server" and "X-client" are combined into a Role-PS in BPMN in a parallel box.
Figure 54:
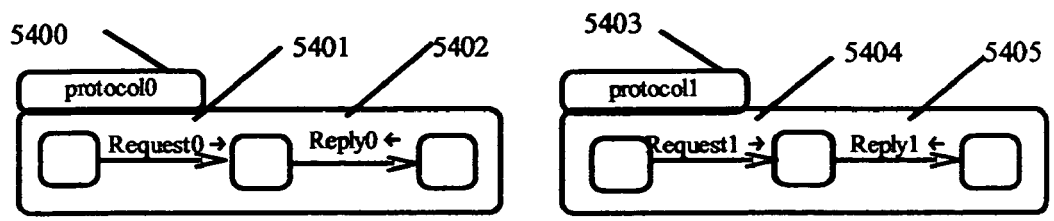
FIG. 54 shows "protocol 0" and "protocol 1" specified in Statechart.
Figure 55:
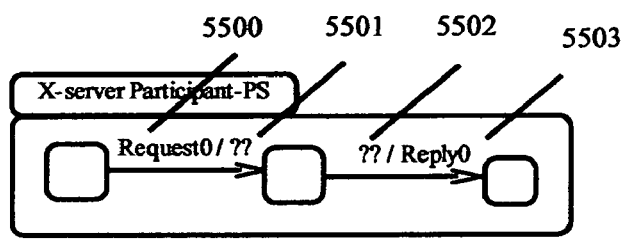
FIG. 55 shows "X-server" in Statechart derived from "protocol0"
Figure 56:
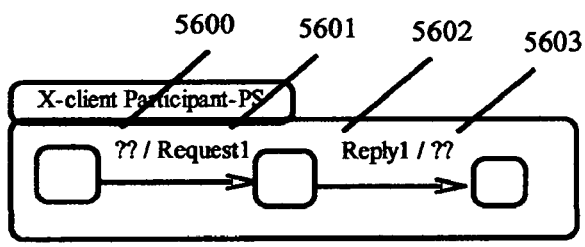
FIG. 56 shows "X-client" in Statechart derived from "protocol1"
Figure 57:
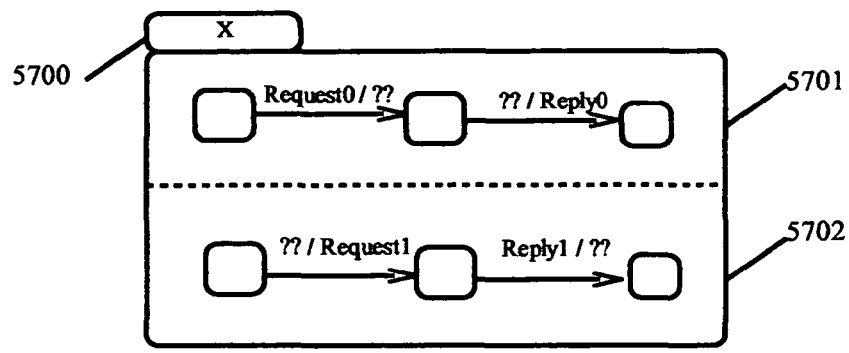
FIG. 57 shows that "X-server" and "X-client" are combined into a Role-PS in Statechart.
Figure 58:
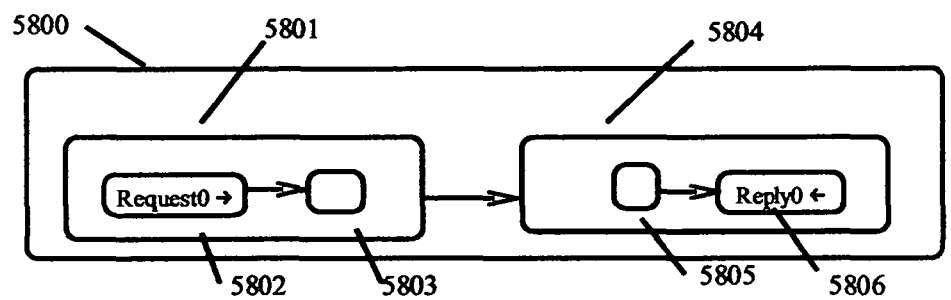
FIG. 58 shows a protocol derived from "X-server" participant composite-activity.

FIG. 36 shows how "X-server" Participant-PS type of FIG. 23 is specified as a composite PS type structure 3600 containing a default Exit-condition set and a PM type "0" 3601. PM type "0" has a Static-count and three Phase types. They are "init" 3615, "0" 3602 and "1" 3605. Its Static-count with a value of 1 indicates that one instance of this PM type is created when the composite PS is created. Phase type "init" 3615 is an Initial phase with a Transition 3616, whose Transition-predicate 3617 is always true and Target-phase 3618 is phase type "0". Note that the dummy null sequential sub-DS is not shown in FIG. 36. Phase type "0" 3602 has one Transition 3603 and a sub-PS type 3604 with an Ext-DS type of "Request0" and an Int-DS type of "??". Phase type "1" 3605 has a Null-phase as its Target-phase 3606 and a predefined "Entry" event type specified as its sub-Ext-DS type 3607.

FIG. 36 also shows an instance 3608 of "X-server" Participant-PS type. The instance has a Result, a type reference 3609 pointing to its type 3600, and a PM "0" 3610, which has a type reference pointing to its PM type "0". PM "0" 3610 has a type reference pointing to its PM type "0" 3601, a Current-phase, and two Phases, namely Phase "0" 3611 and Phase "1" 3613. Phase "0" has a type reference pointing to its Phase type "0" 3602 and a sub-PS 3612 containing a type reference pointing to its PS type 3604 and a Result.

As a specialization of a composite DS of model 1, a composite Int-DS of model 1 can be similarly separated into a type structure and an instance structure. The type structure of a composite Int-DS of model 1 is identical to a composite DS type structure in FIG. 32A or 32B after replacing each "DS" with an "Int-DS". The instance structure of a composite Int-DS of model 1 is identical to a composite DS instance structure in FIG. 32A or 32B after replacing each "DS" with an "Int-DS".

Although type information is abstracted out of the instance information, as long as both type and instance information are accessible at run time, the run time procedures, such as the event matching procedure for an active Ext-DS, the reactive procedure for an active PS, and the action performing procedure for an active Int-DS, described previously in the present invention are still applicable.

Although there are some advantages to have type structure cleanly separated from the instance structure, an embodiment may choose to combine type and instance attributes in a single structure or mix them in certain ways. This is an implementation decision, which is not restricted by this invention.

Those run time procedures described in this invention earlier may need to store some transient data during their executions. In one exemplary embodiment of the present invention, the instance structure of a DS component may contain a local data areas in addition to these defined in an instance structure.

Figure 33:
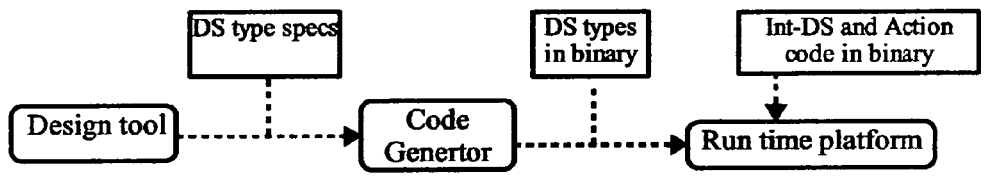
FIG. 33 shows the process to design, build and run DS based application software.

The present invention includes methods and components that can be used to benefit the entire life cycle of developing an application software. One exemplary embodiment of the present invention is to design an application software based on DS components using a design tool, then use a code generator to generate machine readable binary code to be run on a run time platform. As shown in FIG. 33, the output of the design tool is the DS type specification, which can be transmitted to a code generator or stored on a storage device for later retrieval by a code generator. The output of the code generator is a set of DS types in binary format that can be loaded by a run time platform into memory to be executed. The run time platform may also input some supporting binary code that implements basic Actions or some existing Int-DS's.

The design tool may support a graphical user interface (GUI) to allow a designer to define DS components based on the graphical notation described earlier. After the design process is done, the design tool generates the DS type specification, which is a set of user defined DS types or classes, such as PS, Ext-DS and Int-DS types. At design time, the design tool only needs to deal with the type information. Therefore, there is no need to deal with instance structures.

A code generator reads the DS type specification stored on a storage device and then generates these DS types in binary code. The output of the code generator can be stored on a storage device to be retrieved later by a run time platform or be transmitted to the run time platform directly for execution:

During the execution, the run time platform can load the DS types in binary code into memory and create instance structures with references to their type structures as described by this invention. These DS component instances are created and initialized using information available in the DS type specification. These DS components can also be activated and deactivated dynamically following procedures described in this invention to perform their assigned functions.

In one embodiment, a run time platform may implement the action performing procedure to process each composite Int-DS defined in Int-DS types, whereas in another embodiment of this invention may have each composite Int-DS type specification complied into a lower layer code that can be executed more efficiently by the run time platform. A lower layer code may be in the form of a byte code, such as Java® byte code, which can be executed directly by a virtual machine, similar to the Java Virtual Machine. Another lower layer code may be a binary code of a programming language, such as C or Java®. In this case, source code in a programming language for each specific composite Int-DS type can be generated and then compiled into binary code.

The type and instance structures described in this invention are abstract, namely they are implementation independent. These abstract structures need to be mapped to various concrete structures implemented by each tool. For example, these DS components may be stored in one external concrete forms on permanent storage devices and loaded into memory for processing in another internal concrete form. The external concrete form can be any of the following: 1) a programming language, such as C or Java®, 2) a data specification notation, such as Abstract Syntax Notation One, 3) an XML based notation, or 4) any proprietary representation that a visual design tool may support. The internal concrete form can be in the form of a data element in a data specification notation, an XML based notation, a script language, a programming language, such as C or Java®, or a machine readable binary code of any programming language.

The concrete format that implements the abstract structures described in this invention does not have to follow the abstract structure in verbatim. For example, the Static-count in the PM type or Parallel-element type can be in the form of a flag that indicates whether any static instance of a PM should be created statically when its containing composite DS is created. The flag information may also be implemented as a specifically designated bit of another variable. For another example, the Result in a DS instance structure can be implemented as an integer or a complex data structure to contain various result information. In short, the concrete format of an embodiment of this invention does not need to follow the abstract structures described in this invention closely.

Although the present invention uses PS, Ext-DS and Int-DS to model the behavior of a system interacting with others, each of these can be replaced by components of an existing or a future behavior specification technique, script language, or programming language. There is no requirement that all Ext-DS, PS and Int-DS have to be used together.

Figure 34:
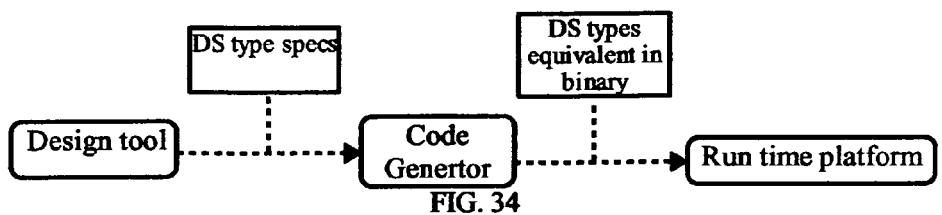
FIG. 34 shows the process to design a DS-based application and build it to run on various run time platforms.

Another embodiment of this invention is to use DS components only in the design and code generation phases. As shown in FIG. 34, an application can be designed based on DS components. However, its output DS type specification can be read by a code generator that generates code for a different platform, which does not support DS components, to run. This code generator would only need to use the DS type structures described in this invention along with a proprietary way to map DS components into another set of mechanisms supported by its run time platform.

CONCLUSIONS

The present invention includes methods and components that can be used to benefit the entire life cycle of developing an application software.

In one embodiment, DS components and methods described in this invention can be used in design, code generation, and execution phases. In another embodiment, DS components and methods are used in design and code generation phases. In yet another embodiment, DS components and methods are used only by a design tool.

Figure 59:
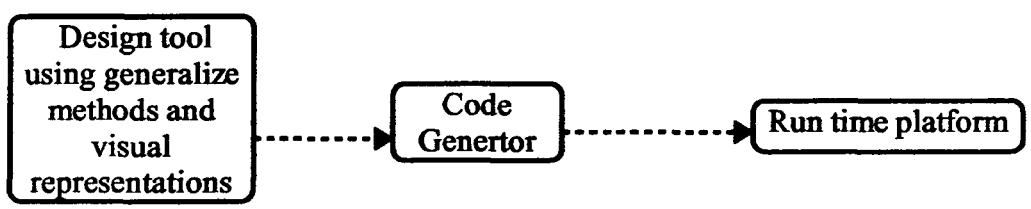
FIG. 59 shows how to follow the design process described in this invention to design an application and build it to run on various run time platforms.

Another embodiment may use generalized methods and graphical notations described in this invention in the design phase along with another behavior modeling notation, such as UML Statechart, UML Activity Diagram, BPMN, XPDL, and BPEL. As shown in FIG. 59, a design tool may support an application design process using those generalized methods and guidelines to specify external behavior and internal behavior of an application system. All or part of the graphical notation described in this invention can be adopted by a design tool to facilitate the design process. However, the resulting behavior may be specified in another behavior modeling notation, such as UML Statechart, UML Activity Diagram, BPMN, XPDL, and BPEL. The resulting behavior can be subsequently used by a code generator to generate binary code to be loaded by a run time platform for execution.

The graphical notation described in this invention is versatile and modular in that not all components need to be supported by a design tool. Hence, a design tool may choose to use only some of those components described in this invention for various purposes. In the next three diagrams, some of these embodiment examples are presented.

Figure 60:
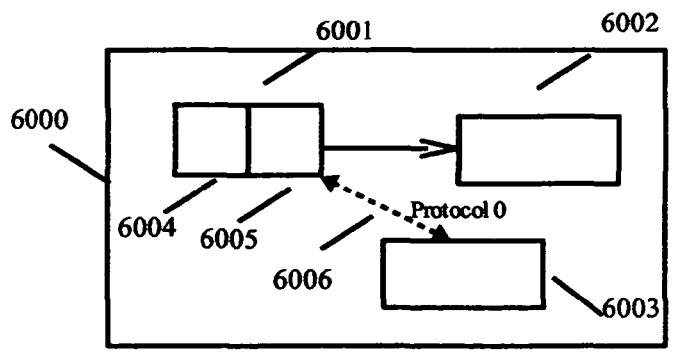
FIG. 60 shows a composite DS with sequential and parallel sub-DS's, one of which is a simple PS.

FIG. 60 shows a containment box 6000 representing an application system whose dynamic behavior is specified as a composite DS including three sub-containment boxes 6001, 6002 and 6003, where two sub-containment boxes 6001 and 6002 represent sequential sub-DS's and one sub-containment box 6003 represents a parallel sub-DS. There is one Transition arrow connecting sub-containment box 6001 to sub-containment box 6002, whereas the parallel sub-DS 6003 does not have any Transition arrow. One of those two sequential sub-DS's is a PS 6001 containing an event sub-sub-containment box 6004 representing an Ext-DS that specifies external events to occur and an action sub-sub-containment box 6005 representing an Int-DS that specifies internal activities to perform in response to the occurrence of these external events. A bi-directional Interaction-link 6006 represents a set of interactions in between a sequential sub-DS 6001 and the parallel sub-DS 6003. The protocol is specified by an identifier as "protocol 0", which is a DS not explicitly specified in this diagram.

Figure 61:
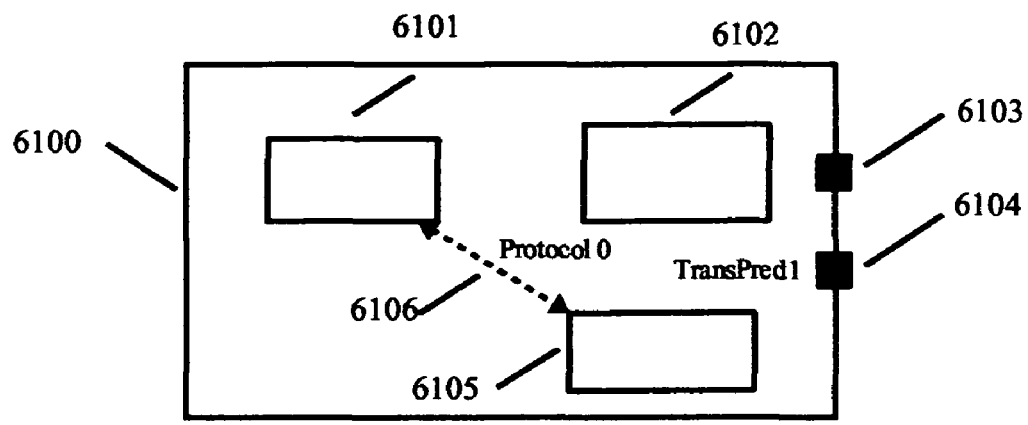
FIG. 61 shows a composite DS with sub-DS's, an Interaction-link and two Exit-points.

FIG. 61 shows a containment box 6100 representing an application system whose dynamic behavior is specified as a composite DS including three sub-containment boxes 6101, 6102 and 6105, each representing a sub-DS. A bi-directional Interaction-link 6106 represents a set of interactions in between two sub-containment boxes 6101 and 6105. The Interaction-link has an identifier "Protocol0" indicating the protocol specification for the set of interactions. The composite-activity DS 6100 has two Exit-points. One Exit-point 6103 has a default Exit-predicate, which is not explicitly shown. The other Exit-point 6104 has an Exit-predicate "TransPred1".

Figure 62:
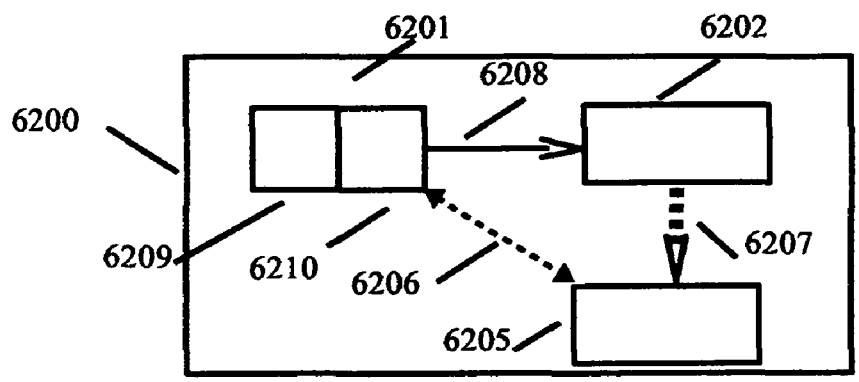
FIG. 62 shows a composite DS with sequential and parallel sub-DS's, one Creation arrow and one Interaction-link.

FIG. 62 shows a containment box 6200 representing an application system whose dynamic behavior is specified as a composite DS 6200 with two sequential sub-DS's 6201 and 6202 and one parallel sub-DS 6205, and an Interaction-link 6206 in between one sequential sub-DS 6201 and the parallel sub-DS 6205. There is one Transition arrow 6208 for pointing from a source sub-containment box 6201 to a target sub-containment box 6202. There is one creation arrow 6207 for pointing to a dynamic component 6205 that may be created by one sequential sub-DS 6202 at run time. One sub-containment box 6201 represents a PS that includes an event sub-sub-containment box 6209 that specifies external events to occur and an action sub-sub-containment box 6210 that specifies internal activities to perform in response to the occurrence of said external events.

Figure 63:
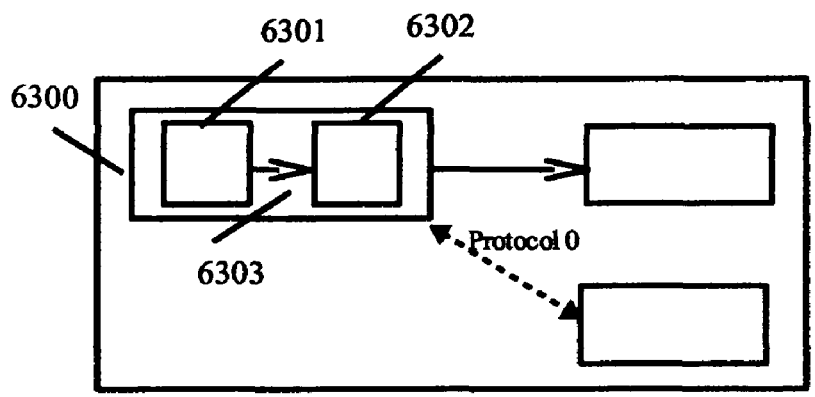
FIG. 63 shows a composite DS with sequential and parallel sub-DS's, and the Ext-DS is linked to the Int-DS by an arrow.

In another embodiment, instead of using a divider to separate the Ext-DS from the Int-DS inside of a PS as shown in FIG. 60, a directional link can be used. FIG. 63 shows the same exemplary composite DS as in FIG. 60 with an additional directional link 6303 connecting the Ext-DS 6301 to the Int-DS 6302 inside of the PS 6300.

In addition to a visual design tool, other tools can be used to generate user defined DS type specifications based on the present invention. For example, a Computer-Aided Software Engineering (CASE) tool may be used. A CASE tool may support creating and editing user defined DS components as part of an overall development methodology incorporating features of this invention.

One CASE tool may provide support for performing analysis and verification of user defined DS type specifications, while another may support reuse of user defined DS type specifications by providing catalogs and directories of existing DS type specifications, and searching/matching capabilities.

Other CASE tools may support simulation of DS component based applications, or even provide automatic testing by generating test cases from these specifications.

In another embodiment, an Integrated Development Environment (IDE) may support the development of software based on the present invention, including design, build and execution time support. In particular, the execution time support may be provided by a run time platform with software libraries to support DS components.

Similar to a run time platform, another embodiment is to support DS components and its run time procedures in a software implemented virtual machine or a computing device that is built entirely in hardware and firmware.

On the other hand, not all DS components need to be automated or executed by software. An alternative embodiment is that a designer may use a design tool to define human activities, business process, or action plans in terms of DS components. Some of these DS components may be jobs for human to perform.

Although the description above contains many specificities, these should not be construed as limiting the scope of the present invention but as merely providing illustrations of some of the presently described embodiments of the present invention. Based on the disclosure and teachings provided herein, it will be appreciated by a person of ordinary skill in the art that various other embodiments and ramifications are possible within the scope of the present invention.

The application of the present invention is very extensive, since most systems solving real world problems can be modeled as reactive systems. For example, in a 3-tier architecture, the database management system can be viewed as a reactive system reacting to input from its upper tier servers. Servers can be viewed as systems reacting to input from its upper tier, namely the presentation tier. The presentation tier can also be viewed as systems reacting to input from human beings. In other words, nearly all computing systems can be modeled by DS, PS, Ext-DS and Int-DS described in the present invention and benefit from the extended, advanced features as described above.

The present invention can also be used to model highly complex communication protocols. In particular, using a composite DS specification, a protocol not only supports one single session, but also supports multiple concurrent nested sessions.

The present invention can also be used to model man-machine interfaces. A human user can deal with multiple things at the same time. To match such a multi-processing capability of a human user, a graphical user interface based application may use a composite DS to define its interface with human users, while using a composite PS to define its reactive behavior.

With its highly sophisticated modeling capabilities, it is even possible to model human behavior or an organization behavior with the present invention. For example, the entire business process of an organization can be modeled by a composite PS with various levels of sub-PS's that implement behavior of departments, teams and employees. The process of planning, decision making and problem solving can also be modeled using DS, PS, Ext-DS and Int-DS.

A general business operation environment, such as a business process management platform, a work flow engine or a general business operational framework, can be implemented by supporting DS, PS, Ext-DS and Int-DS specifications for carrying out various business processes and activities.

Some real world objects, which can have multiple states, such as machinery, customer records, and order entries, can also be modeled with DS's or their extensions.

Using the method of the present invention for modeling and designing various application systems, such as the ones described above, DS, PS, Ext-DS and Int-DS specifications can be defined. Some of these specifications can also be generated or derived using other approaches. Disregarding which approach to use, the resulting user DS, PS, Ext-DS and Int-DS specifications of these applications can be performed by a device or machine, such as a computer, that practicing the present invention to carry out these specifications.

In general, the present invention can be embodied in the form of methods and apparatuses for practicing those methods and operations. The present invention can also be embodied in the form of program code embodied in tangible media, such as floppy diskettes, CD-ROMs, disk drives, or any other machine-readable storage medium. When the program code is loaded into and executed by a device or machine, such as a computer, the machine becomes an apparatus for practicing the invention. The present invention can also be embodied in the form of program code, which can be transmitted over some transmission medium, such as electrical wiring or cabling, through fiber optics, or via electromagnetic radiation. When the program code is loaded into and executed by a device or machine, such as a computer, the machine becomes an apparatus for practicing the invention.

Accordingly, it can be seen that DS components and their related methods and procedures described in accordance with the present invention is a very powerful method and technique to define behavior and protocols of systems. In particular, the present invention extends and improves the prior art, BPMN, XPDL, BPEL, WS-CDL or UML, in several major areas.

One is that the DS model, which reflects both time and space dimensions in the universe we live in, adds significant meaning and structure to a bunch of nodes and links specified with a prior art technique. The second is that using a containment box to contain both sequential and parallel components in a diagram, various forking and joining nodes and links can be eliminated. The third is that the combination of Result and Exit-conditions provides a very powerful and flexible mechanism to control when a composite DS should end. The forth is the use of specializations of DS, such as Ext-DS, PS, and Int-DS, to specify external behavior, reactive behavior and internal behavior of a system in a consistent way. The fifth is to specify the behavior of multiple systems that may have complex interactions with each other.

It is understood that the examples and embodiments described herein are for illustrative purposes only and that various modifications or changes in light thereof will be suggested to persons skilled in the art and are to be included within the spirit and purview of this application and scope of the appended claims. It is further understood that various changes in the details, materials, and arrangements of the parts which have been described and illustrated in order to explain the nature of this invention may be made by those skilled in the art without departing from the principle and scope of the invention as expressed in the claims. All publications, patents, and patent applications cited herein are hereby incorporated by reference for all purposes in their entirety.

What is claimed is:

1. A non-transitory computer-readable storage medium containing instructions for controlling a computer system to be operable to:
   receive a specification of at least one composite computation module type for specifying a behavior of an application software in a hierarchical structure, wherein receive the specification of the at least one composite computation module type comprises:
   receive a specification of an exit-condition-set comprised of at least one exit-condition, wherein said exit-condition is comprised of a pair of an exit-predicate that specifies a condition under which said composite computation module type exits and an exit-code that identifies said exit-condition; and
   receive a specification of at least one phased-machine type including at least one phase type,
      wherein said phase type is comprised of a subordinate computation module type and at least one phase-transition,
         wherein said subordinate computation module type comprises one of a lower level composite computation module type and a simple computation module type for specifying a behavior of said subordinate computation module type; and
      wherein said phase-transition is comprised of a target-phase for specifying a next said phase type to become active after said subordinate computation module type exits, and a transition-predicate for specifying a condition under which the phase-transition is to take place; and
   output a design specification for use to automatically generate software code for the application software, wherein when said application software is executed, a composite computation module instance of said specified composite computation module type is instantiated in which:
   a phased-machine instance of each said specified phased-machine type is instantiated in which a subordinate computation module instance of each said subordinate computation module type is instantiated,
   when said subordinate computation module exits, a subordinate computation module instance of the target-phase, which is specified in the phase-transition whose transition-predicate is true, becomes active, and
   said composite computation module instance exits based on said specification of said exit-condition-set.

2. The non-transitory computer-readable storage medium of claim 1, wherein at least one said phased machine type further is comprised of a static-count specifying a number of static instances of said phased-machine type to be instantiated when said application software is executed.

3. The non-transitory computer-readable storage medium of claim 1, wherein at least one said phased-machine type is comprised of a single said phase type.

4. The non-transitory computer-readable storage medium of claim 1, wherein said simple computation module type further is comprised of a first said subordinate computation module type that specifies external events to occur and a second said subordinate computation module type that specifies internal actions to perform in response to the occurrence of said external events.

5. The non-transitory computer-readable storage medium of claim 1, wherein at least one said composite computation module type in said software code is specified in one of a data specification notation, an eXtensible Markup Language (XML) based notation, and a graphical notation.

6. A non-transitory computer-readable storage medium containing instructions for controlling a computer system to be operable to:
   determine a specification of at least one composite computation module type for specifying a behavior of an application software in a hierarchical structure, wherein determine the specification of the at least one composite computation module type comprises:
   determine a specification of an exit-condition-set comprised at least one exit-condition, wherein said exit-condition is comprised of a pair of an exit-predicate that specifies a condition under which said composite module type exits and an exit-code that identifies said exit-condition; and
   determine a specification of at least one phased-machine type including at least one phase type,
      wherein said phase type is comprised of a subordinate computation module type and at least one phase-transition,
         wherein said subordinate computation module type comprises one of a lower level composite computation module type and a simple computation module type for specifying the behavior of said subordinate computation module type; and wherein said phase-transition is comprised of a target-phase for specifying a next said phase type to become active after said subordinate computation module type exits, and a transition-predicate for specifying a condition under which the phase-transition is to take place; and automatically output software code for the application software, wherein when said application software is executed, a composite computation module instance of said specified composite computation module type is instantiated in which:

a phased-machine instance of each said specified phased-machine type is instantiated in which a subordinate computation module instance of each said subordinate computation module type is instantiated, when said subordinate computation module instance exits, a subordinate computation module instance of the target-phase, which is specified in the phase-transition whose transition-predicate is true, becomes active, and said composite computation module instance exits based on said specification of said exit-condition-set.

7. A non-transitory computer-readable storage medium containing instructions for controlling a computer system to be operable to:

determine a specification of at least one composite computation module type for specifying a behavior of an application software in a hierarchical structure, wherein determine the specification of the at least one composite computation module type comprises:

determine a specification of an exit-condition-set comprised of at least one exit-condition, wherein said exit-condition is comprised of a pair of an exit-predicate that specifies a condition under which said composite computation module type exits and an exit-code that identifies said exit-condition; and determine a specification of at least one phased-machine type including at least one phase type, wherein said phase type is comprised of a subordinate computation module type and at least one phase-transition, wherein said subordinate computation module type comprises one of a lower level composite computation module type and a simple computation module type for specifying a behavior of said subordinate computation module type; and wherein said phase-transition is comprised of a target-phase for specifying a next said phase type to become active after said subordinate computation module type exits, and a transition-predicate for specifying a condition under which the phase-transition is to take place; and instantiate a composite computation module instance of each said specified composite computation module type in which:

a phased-machine instance of each said specified phased-machine type is instantiated in which a subordinate computation module instance of each said subordinate computation module type of each said phased-machine type is instantiated, when said subordinate computation module instance of one of the phased-machine instances exits, the subordinate computation module instance of the target-phase, which is specified in the phase-transition whose transition-predicate is true, becomes active, and said composite computation module instance exits based on said specification of said exit-condition-set.

8. A method comprising:

receiving a specification of at least one composite computation module type for specifying a behavior of an application software in a hierarchical structure, wherein receiving the specification of the at least one composite computation module type comprises:

receiving a specification of an exit-condition-set comprised of at least one exit-condition, wherein said exit-condition is comprised of a pair of an exit-predicate that specifies a condition under which said composite computation module type exits and an exit-code that identifies said exit-condition; and receiving a specification of at least one phased-machine type including at least one phase type, wherein said phase type is comprised of a subordinate computation module type and at least one phase-transition, wherein said subordinate computation module type comprises one of a lower level composite computation module type and a simple computation module type for specifying a behavior of said subordinate computation module type; and wherein said phase-transition is comprised of a target-phase for specifying a next said phase-type to become active after said subordinate computation module type exits, and a transition-predicate for specifying a condition under which the phase-transition is to take place; and outputting, by a computing device, a design specification for use to automatically generate software code for the application software, wherein when said application software is executed, a composite computation module instance of said specified composite computation module type is instantiated in which:

a phased-machine instance of each said specified phased-machine type is instantiated in which a subordinate computation module instance of each said subordinate computation module type is instantiated, when said subordinate computation module instance exits, the subordinate computation module instance of the target-phase, which is specified in the phase-transition whose transition-predicate is true, becomes active, and said composite computation module instance exits based on said specification of said exit-condition-set.

9. A method comprising:

determining a specification of at least one composite computation module type for specifying a behavior of an application software in a hierarchical structure, wherein determining the specification of the at least one composite computation module type comprises:

determining a specification of an exit-condition-set comprised at least one exit-condition, wherein said exit-condition is comprised of a pair of an exit-predicate that specifies a condition under which said composite module type exits and an exit-code that identifies said exit-condition; and determining a specification of at least one phased-machine type including at least one phase type, wherein said phase type is comprised of a subordinate computation module type and at least one phase-transition, wherein said subordinate computation module type comprises one of a lower level composite computation module type and a simple computation module type for specifying the behavior of said subordinate computation module type; and wherein said phase-transition is comprised of a target-phase for specifying a next said phase type to become active after said subordinate computation module type exits, and a transition-predicate for specifying a condition under which the phase-transition is to take place; and automatically outputting, by a computing device, software code for the application software, wherein when said application software is executed, a composite computation module instance of said specified composite computation module type is instantiated in which:

a phased-machine instance of each said specified phased-machine type is instantiated in which a subordinate computation module instance of each said subordinate computation module type is instantiated, when said subordinate computation module instance exits, the subordinate computation module instance of the target-phase, which is specified in the phase-transition whose transition-predicate is true, becomes active, and said composite computation module instance exits based on said specification of said exit-condition-set.

10. A method comprising:

determining a specification of at least one composite computation module type for specifying a behavior of an application software in a hierarchical structure, wherein determining the specification of the at least one composite computation module type comprises:

determining a specification of an exit-condition-set comprised at least one exit-condition, wherein said exit-condition is comprised of a pair of an exit-predicate that specifies a condition under which said composite module type exits and an exit-code that identifies said exit-condition; and determining a specification of at least one phased-machine type including at least one phase type, wherein said phase type is comprised of a subordinate computation module type and at least one phase-transition, wherein said subordinate computation module type comprises one of a lower level composite computation module type and a simple computation module type for specifying the behavior of said subordinate computation module type; and wherein said phase-transition is comprised of a target-phase for specifying a next said phase type to become active after said subordinate computation module type exits, and a transition-predicate for specifying a condition under which the phase-transition is to take place; and instantiating, by a computing device, a composite computation module instance of said specified composite computation module type in which:

a phased-machine instance of each said specified phased-machine type is instantiated in which a subordinate computation module instance of each said subordinate computation module type is instantiated, when said subordinate computation module instance exits, the subordinate computation module instance of the target-phase, which is specified in the phase-transition whose transition-predicate is true, becomes active, and said composite computation module instance exits based on said specification of said exit-condition-set.

* * * * *